United States Patent
Iverson

(10) Patent No.: US 12,403,844 B2
(45) Date of Patent: Sep. 2, 2025

(54) WINDSHIELD PHONE MOUNT WITH EXTENSION ARM BUMPER

(71) Applicant: MACNEIL IP LLC, Bolingbrook, IL (US)

(72) Inventor: David S. Iverson, Oak Brook, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 328 days.

(21) Appl. No.: 17/975,756

(22) Filed: Oct. 28, 2022

(65) Prior Publication Data

US 2024/0067103 A1     Feb. 29, 2024

Related U.S. Application Data

(63) Continuation-in-part of application No. 17/895,779, filed on Aug. 25, 2022.

(51) Int. Cl.
  *B60R 11/02* (2006.01)
  *B60R 11/00* (2006.01)

(52) U.S. Cl.
  CPC ... *B60R 11/0241* (2013.01); *B60R 2011/0026* (2013.01); *B60R 2011/0056* (2013.01); *B60R 2011/0075* (2013.01)

(58) Field of Classification Search
  CPC ......... B60R 11/0241; B60R 2011/0026; B60R 2011/0056; B60R 2011/0075; B60R 11/02; B60R 2011/0005
  USPC ..... 224/482, 483, 279, 292, 37.3, 37.6, 558; 248/351, 125.8, 121
  See application file for complete search history.

(56) References Cited

U.S. PATENT DOCUMENTS 2,766,330 A * 10/1956 Olsen ...................... H04M 1/04
                                       379/454
2,770,682 A * 11/1956 Malone .................... H04M 1/04
                                       379/454
2,950,836 A * 8/1960 Murdock ............ A24F 19/0092
                                       297/188.2
3,104,895 A * 9/1963 Feuerbach et al. .... B60N 3/002
                                       248/455

(Continued)

FOREIGN PATENT DOCUMENTS

WO       WO-0137702 A1 * 5/2001 ............. A46B 13/02

OTHER PUBLICATIONS https://www.amazon.com/Windshield-Anti-Shake-Stabilizer-Compatible-Smartphone/dp/B0BG68VBYS, Car Phone Holder Mount, Cell Phone Holder Car, Universal Car Phone Mount Windshield with Strong Suction, Anti-Shake Stabilizer Phone Car Holder, Compatible with All iPhone Android Smartphone, Sep. 22, 2022, Amazon (Year: 2022).*

(Continued)

*Primary Examiner* — Kimberly T Wood
(74) *Attorney, Agent, or Firm* — Perkins IP Law Group LLC; Jefferson Perkins

(57) ABSTRACT

A windshield phone mount includes a telescoping arm assembly that brings the mounted cell phone or other personal electronic device within the maximum reach envelope of the driver. A bumper substantially surrounds an arm component in cross section and rests on the dashboard near the rear edge thereof. Living hinges in the bumper allow it to be pried apart and installed on the arm component without tearing. A user may select from a kit of arms for use in assembling the complete mount.

9 Claims, 32 Drawing Sheets

(56) References Cited

U.S. PATENT DOCUMENTS

| | | | | |
|---|---|---|---|---|
| 3,968,950 | A * | 7/1976 | Gallo | A46B 17/00 248/688 |
| 4,071,174 | A * | 1/1978 | Weiner | B60R 7/081 40/643 |
| D293,488 | S * | 12/1987 | Emmons | D28/38 |
| 4,735,388 | A * | 4/1988 | Marks | A61J 9/0638 248/103 |
| 5,025,919 | A * | 6/1991 | Brinker | B42D 5/007 206/214 |
| 5,195,711 | A | 3/1993 | Miller et al. | |
| 5,392,350 | A * | 2/1995 | Swanson | B60R 11/02 379/426 |
| 5,624,064 | A | 4/1997 | McGee | |
| 5,678,793 | A | 10/1997 | Hill | |
| 5,745,565 | A | 4/1998 | Wakefield | |
| 5,779,205 | A * | 7/1998 | Ching | F16M 11/041 248/205.8 |
| 5,875,516 | A * | 3/1999 | Blue | A46B 15/0097 248/688 |
| 6,349,905 | B1 * | 2/2002 | Mills | F16M 11/28 248/278.1 |
| 6,552,270 | B1 * | 4/2003 | Heacox | F16L 3/233 174/72 A |
| 6,644,987 | B2 | 11/2003 | Meleck | |
| 6,668,415 | B2 * | 12/2003 | Rohrig | A46B 5/023 248/688 |
| 6,758,446 | B2 * | 7/2004 | Bjornrud | A46B 17/02 248/351 |
| 7,021,593 | B1 * | 4/2006 | Fan | F16B 47/00 248/292.12 |
| 7,040,590 | B2 | 5/2006 | Carnevali | |
| 7,140,586 | B2 | 11/2006 | Seil et al. | |
| D558,769 | S | 1/2008 | Krieger et al. | |
| 7,448,812 | B2 * | 11/2008 | Heibel | B60R 11/04 396/419 |
| 7,684,694 | B2 * | 3/2010 | Fromm | F16M 11/28 |
| 7,731,144 | B2 | 6/2010 | Kazyaka | |
| 8,403,276 | B2 * | 3/2013 | Lewis | G10G 5/00 248/176.1 |
| 8,636,260 | B2 * | 1/2014 | Gauger | A47L 13/51 248/110 |
| 8,844,099 | B2 * | 9/2014 | Puig | B25G 1/102 16/422 |
| 8,857,687 | B1 * | 10/2014 | An | B60R 11/02 224/482 |
| 8,967,561 | B2 * | 3/2015 | Cheng | F16M 11/2014 248/176.1 |
| 9,254,793 | B2 | 2/2016 | Won | |
| D807,693 | S * | 1/2018 | Obmaces | D7/393 |
| 9,950,731 | B2 | 4/2018 | Kim et al. | |
| D832,248 | S | 10/2018 | Sukphist et al. | |
| 10,381,810 | B1 * | 8/2019 | Tsay | H02G 1/14 |
| 10,576,905 | B1 | 3/2020 | MacNeil et al. | |
| D900,087 | S | 10/2020 | Leeds-Frank et al. | |
| 10,932,601 | B1 | 3/2021 | Fan | |
| D934,231 | S | 10/2021 | Liao | |
| 2003/0231917 | A1 * | 12/2003 | Geddes | B43K 23/008 401/6 |
| 2006/0113434 | A1 * | 6/2006 | Richter | B60R 11/0235 248/121 |
| 2007/0262216 | A1 * | 11/2007 | Wang | B60R 11/02 248/205.3 |
| 2008/0099521 | A1 * | 5/2008 | Huang | B60R 11/04 224/483 |
| 2008/0223997 | A1 * | 9/2008 | Peterson | A47J 43/28 248/176.1 |
| 2010/0320341 | A1 * | 12/2010 | Baumann | F16B 47/006 248/299.1 |
| 2011/0006091 | A1 * | 1/2011 | Schafer | F16M 11/28 224/282 |
| 2011/0073743 | A1 * | 3/2011 | Shamie | F16M 11/041 248/537 |
| 2012/0168581 | A1 * | 7/2012 | Cheng | F16M 11/041 248/278.1 |
| 2012/0292463 | A1 * | 11/2012 | Burns | F16M 11/40 248/125.8 |
| 2015/0282600 | A1 | 10/2015 | Richards | |
| 2016/0173667 | A1 * | 6/2016 | Torres Gutierrez | H02J 7/0044 455/575.1 |
| 2016/0183734 | A1 * | 6/2016 | Ordal | A46B 17/02 248/351 |
| 2021/0138970 | A1 * | 5/2021 | Walker | F16M 13/00 |
| 2021/0387577 | A1 * | 12/2021 | Morgan | B60R 11/0241 |

OTHER PUBLICATIONS https://www.amazon.com/Windshield-Volport-Universal-Windscreen-Dashboard/dp/B0793RSSDM; volport Windshield Car Phone Mount, Gooseneck Flexible Cell Phone Holder for Car Window, Universal 360 Degree Rotation Long Arm, Windscreen Suction Cup Cradle with Anti-Shake Stabilizer for iPhone; Jan. 18, 2018, Amazon (Year: 2018).*

* cited by examiner

WINDSHIELD PHONE MOUNT WITH EXTENSION ARM BUMPER

RELATED APPLICATIONS

This application is a continuation in part of copending U.S. patent application Ser. No. 17/895,779, owned by the applicant hereof. The entire disclosure and drawings of the foregoing application are hereby fully incorporated by reference herein.

BACKGROUND OF THE INVENTION

It is known to mount a personal electronic device, such as a cell phone, a tablet or a GPS device, in a vehicle interior. Mounts have been provided to mount the device to a variety of interior surfaces, such as a cupholder, a heater/air conditioning vent, a dashboard or the inside surface of the vehicle windshield.

Recent models of these devices have displays that take up the entire front of the device. Ideally, the front surface should be presented to the driver in a plane orthogonal to the driver's line of sight. Further, the lens of the human eye changes shape when it changes focus from an object closer to the eye to an object farther away from it. When driving, what is happening out on the road is close to infinity in terms of lens focus. To minimize the disparity in focus, the device could be positioned on the windshield to be as far from the driver as possible. It is also advantageous to position any such display such that the driver does not have to divert his or her line of sight from what is happening on the road. But, for many such devices, it is advantageous to position the device within arm's reach of the driver.

This in turn means that the device should be mounted close to the interior surface of the windshield, not far from the driver's forward line of sight. In most current vehicles, the windshield slants upwardly and rearwardly by a considerable angle. Mounting the device close to the windshield interior surface effectively obstructs the removal of the device from the mount in a vertical direction, and likewise prohibits the reinstallation of the device into the mount from this direction.

Ideally, a device should be able to be installed into the mount in a horizontal direction, and removed from the mount the same way. Further, it would be ideal to install the device into, and remove the device from, the mount with one hand.

One consideration in mounting a cell phone in a vehicle is whether the device as mounted is within a hand reach control envelope relative to the driver. Positioning a cell phone or other personal electronic device rearwardly of a dashboard margin places the cell phone within this hand reach control envelope. A need exists to provide such a mount, in such a way that the cell phone and the mount stay affixed to vehicle support surfaces and are resistant to shear forces tending to separate them.

SUMMARY OF THE INVENTION

According to one aspect of the invention, a mount for a personal electronic device is provided. The mount, which can be for a cell phone, a tablet, a GPS device or the like, is configurable to assume an open configuration in which the device may be removed from the mount in a predetermined first direction, such as rearward, and a closed configuration in which the device may not be so removed in that direction. The mount has first and second support plates operable to support the device. The first support plate is substantially oriented in a first plane when the mount is in the closed configuration, and is substantially oriented in a second plane at an angle to the first plane in when the mount is in the open configuration. In either configuration, the second support plate stays substantially oriented in the first plane.

In one embodiment, the first support plate is part of a first jaw and the second support plate is part of a second jaw. The first jaw has a laterally inwardly facing first channel. The second jaw has a laterally inwardly facing second channel. The first channel is adapted to cage a first lateral side of the device when the mount is in the closed configuration. The second channel is adapted to cage a second lateral side of the device, with the second lateral side being laterally spaced from the first lateral side. The second jaw is laterally slidable relative to a base of the mount so as to size a width between the first channel and the second channel of the mount to a width of the device between its first and second lateral sides.

In one embodiment, the first support plate is a portion of a first jaw. The first jaw has a first channel surface which rearwardly extends from the first support plate to a rearward end. A first lip of the first jaw laterally inwardly extends from the rearward end of the first channel surface. The first support plate and the first lip are operable to cage the first lateral side of the device when the mount is in the closed configuration. In the open configuration, the first lip is laterally outwardly displaced, such that the first lateral side of the device is no longer caged between the first support plate and the first lip. This permits the device to be removed from the mount in the first direction.

In another aspect of the invention, a mount for a personal electronic device is provided, wherein the mount is configurable to an open configuration in which the device may be removed from the mount in a predetermined first direction, such as towards the rear, and is further configurable to assume a closed configuration in which the device may not be removed from the mount in the first direction. The mount has a base with a laterally outwardly extending first finger tab, and a holding element hinged to the base and having a laterally outwardly extending second finger tab. The second finger tab is spaced from the first finger tab by a first distance when the mount is in the open configuration. The second finger tab is positioned to be farther away than the first distance from the first finger tab when the mount is in the closed configuration. A user may pinch the first and second finger tabs, moving the second finger tab toward the first finger tab, in order to reconfigure the mount from the closed configuration to the open configuration.

In another aspect of the invention, a mount for a personal electronic device is configurable to assume an open configuration in which the device may be removed from the mount in a predetermined first direction, such as rearward, or to assume a closed configuration in which the device may not be removed from the mount in the first direction. The mount has a base and a first support plate hinged to the base at an axis. At least one tab of the first support plate extends radially inwardly relative to the axis. The first support plate substantially occupies a first plane when the mount is in the closed configuration, and substantially occupies a second plane when the mount is in the open configuration. The second plane is at an angle to the first plane. The tab is operable to contact a back of the device when it is desired to install the device into the mount in a second direction opposite the first direction. A predetermined force exerted by the user through the back of the device will cause the first support plate to pivot from the second plane to the first plane, thereby causing the mount to be reconfigured from the open configuration to the closed configuration.

In one embodiment, the mount has a second support plate that has an inner margin. The second support plate is substantially aligned with the first plane. The second support plate has a laterally extending slot. A fastener extends in the first direction from the base and into the slot, such that the second support plate is slidably affixed to the base. The second support plate is laterally slidable from a narrowest position in which the second support plate is closest to the first support plate, to a widest position in which the second support plate is farthest away from the first support plate. In the narrowest position, the tab of the first support plate abuts an inner margin of the second support plate.

In one embodiment, the aforementioned tab is one of an upper and lower tab on the first support plate. A center portion of the right margin of the second support plate extends more to the right than does either an upper portion or a lower portion of this margin, so as to extend the slot, and therefore the lateral distance through which the second support plate can slide. When mated together at a minimum width position, the center portion of the second support plate right margin is disposed rightward of the upper and lower inner tabs of the first support plate.

In one embodiment, the first support plate is operable to be moved from the first plane to the second plane, and vice versa. A detenting structure indexes the first and second planes, so that the mount snaps open and closed. The detenting structure resists up to a predetermined degree of rotational force, to keep the mount in the desired open or closed configuration, and provides tactile and aural feedback to the user confirming that the desired configuration has been achieved.

In another aspect of the invention, a mount for a personal electronic device includes a base that is substantially oriented to a base plane. A pivoting jaw is hinged to the base at an axis. The axis is disposed parallel to the base plane. The pivoting jaw is pivotable between a closed configuration in which the device may not be removed from the mount in a predetermined first direction, such as rearward, and an open configuration in which the device may be so removed. The pivoting jaw has a side plate extending in the first direction to a side plate end. A lip of the pivoting jaw extends laterally inwardly from the side plate end by a lip width to an inner lip end. The inner lip end is at a predetermined radius from the axis, where the radius is orthogonal to the axis. A position of the inner lip end while in the open configuration is separated from a position of the inner lip end while in the closed configuration by an angle measured around the axis. A ratio of the lip width to the radius is no greater than a sine of the angle, such that in the open configuration, the inner lip end will be angularly displaced out of the way from a path of a lateral side of the electronic device as the device is being removed from the mount in the first direction.

In another aspect of the invention, a method for mounting a personal electronic device to a surface is provided. The surface may, for example, be an interior surface of a slanting vehicle windshield. A mount is provided that has a closed configuration in which the device may not be removed from the mount in a predetermined first direction (such as rearward), and an open configuration in which such removal is possible. The mount further has a base and an attachment arm with a first end fastened to the base and a second end remote from the base.

The mount is either received by the user in the closed configuration, or the user places the mount in the closed configuration. Next, the device is placed on the first and second support plates of the mount. The second support plate is slid in a first plane relative to the base, so that a channel rearwardly extending from the second support plate cages a second lateral side of the device, and so that a channel rearwardly extending from the first support plate cages a first lateral side of the device, with the second lateral side being spaced from the first lateral side. Next, the device is removed from the mount, in a second direction substantially orthogonal to the first direction, such as upward. Alternatively the user may pinch the external tabs of the first jaw and the base to put the first support plate in an open configuration, thereby permitting the electronic device to be removed from the mount in a rearward direction.

The now-empty but width-adjusted mount is next attached, by the second end of the attachment arm, to the surface. If he or she has not already done so, the user then pivots the first support plate relative to the base, such that the first support plate is substantially aligned to a second plane that is tilted relative to the first plane. This configures the mount to the open configuration. The user then moves the device in a third direction which is opposite the first direction (e.g. forward) until the back of the device contacts the first support plate. The user further moves the device in the third direction, causing the first support plate to pivot from the second plane back to the first plane, thereby caging the first lateral side of the device and preventing the device's removal from the mount in the first direction. This securely holds the electronic device relative to the windshield.

Later, the user may wish to remove the device from the mount. This is accomplished by pinching a first finger tab, which laterally outwardly extends relative to the first support plate, toward a second finger tab, which laterally outwardly extends from the base. This pivots the first support plate to the second plane, and causes the first lateral side of the device to be uncaged from the first channel, permitting the device to be removed from the mount in the first direction.

The mount may therefore hold the electronic device in close proximity to the inner surface of the windshield, and in a position in which it would not be possible to lift the device upwardly out of the jaws of the mount. With one hand, the user pinches together the finger tabs, opening the mount and permitting the removal of the device from the mount. To install the device, the user simply presses, with one hand, the back of the device against the inner tab(s) of the pivoting support plate, causing the first support plate to pivot back to the closed configuration. As so installed, the device is closer to the focal plane that the driver is using while driving on the road, enhancing the acuity with which the driver perceives road conditions and decreasing any loss of focus on the road caused by focusing on the device screen.

In another aspect of the invention, a mount for a personal electronic device, such as a cell phone, GPS device, tablet or the like, has a mounting component for affixation to a rear surface of a vehicle windshield. The mount further has a device mounting bracket for holding the personal electronic device. An elongate arm assembly is joined to and extends between the mounting component and the device mounting bracket. The arm assembly has at least a first arm component that, in use, is positioned over the rearward margin of a vehicle dashboard. At least a portion of this first arm component has a predetermined cross-sectional shape. A bumper, formed of elastomeric material, substantially surrounds the cross-sectional shape of the first arm component. The bumper is positioned on the first arm component so as to be near the rearward margin of the vehicle dashboard, such that the bumper, and not the first arm component, will contact the dashboard.

In one embodiment, the bumper is integrally molded of an elastomeric material. The bumper has a hollow inner shape which substantially conforms to the cross-sectional shape of the first arm component, a bumper outer periphery spaced from and surrounding the inner shape, and an opening extending from the bumper outer periphery to the inner shape. The opening has first and second opposed sidewalls that are disposed at a first width from each other when the bumper is in an unflexed condition. At least one outer groove inwardly extends toward the inner shape from the bumper periphery, and has a groove bottom near the inner shape. At least one living hinge is formed between the groove bottom and the inner shape. Prying force flexes this living hinge and moves the first sidewall away from the second sidewall, such that the first sidewall is positioned at second width from the second sidewall, where the second width is greater than the first width. This permits the insertion of the cross-sectional shape of the first arm component through the opening and into the inner shape of the bumper. When prying force is removed, the first sidewall is again positioned to be at the first width from the second sidewall. In some embodiments, several living hinges of the bumper are created by the near approach of a plurality of grooves to the inner shape, aiding in the flexing of the bumper.

In embodiments, the aforementioned arm assembly also includes a second arm component. The first arm component is slidable with respect to the first arm component such that a length of the arm assembly between the mounting component and the device mounting bracket may be adjusted. Is some embodiments, the arm assembly further includes a third arm component that is slidably attached to the second arm component. A forward end of the third arm component may be joined to the mounting component, while a rearward end of the first arm component may be joined to the device mounting bracket.

In a further aspect of the invention, there is provided a kit for mounting a personal electronic device to a rear surface of a vehicle windshield. The kit includes a mounting component for affixation to the rear surface of a vehicle windshield, a device mounting bracket for holding the personal electronic device, and a plurality of elongate arms each adapted to join the mounting component to the device mounting bracket. The arms include a first arm and a second arm. The first arm has a first rear end adapted to be rotatably joined to the mounting component, and a first forward end remote from the first rear end and adapted to be rotatably joined to the device mounting bracket. The second arm has a second rear end adapted to be rotatably joined to the mounting component and a second forward end remote from the second rear end. The second forward end is separated from the second rear end by a second total length that is greater than the first length. The user selects either the first or the second arm for assembly to the mounting component and to the device mounting bracket, thereby completing a mount for mounting the electronic device to the rear surface of the windshield.

In one embodiment, the second arm has a plurality of second arm components slidable in relation to each other and affixed to each other in a user-selected position, such that the second total length may be adjusted by the user. In one embodiment, the kit may further include a third arm whose length is intermediate the first arm length and the second arm total length.

In a further aspect of the invention, a bumper is provided for an arm assembly of a cell phone mount for mounting to a rear surface of a windshield of a vehicle, wherein the arm assembly further is adapted to place the cell phone rearwardly of a vehicle dashboard. A body of the bumper is formed of an elastomer. The body has a hollow inner shape and an outer periphery spaced from the inner shape. The inner shape substantially surrounds a cross section of the arm assembly. The outer periphery has an upper portion and a lower portion spaced from the upper portion. The upper and lower portions of the bumper each have a plurality of outwardly extending fingers separated from each other by grooves, such that, in use, either the fingers of the upper portion or the fingers of the lower portion will cushion contact of the arm assembly with the vehicle dashboard.

In a still further aspect of the invention, a bumper and arm assembly is provided for a cell phone mount. The assembly includes an elongate arm having a length between a forward end and a rearward end. The arm has a uniform cross section along a major portion of its length. The bumper is formed of an elastomeric material and has a hollow, cross-sectional inner shape that substantially conforms to the uniform cross-section of the major portion of the arm. The bumper further has a cross-sectional outer shape. An opening of the bumper joins the inner shape to the outer shape and separates first and second ends of the bumper. At least one hinge is formed in the bumper between the inner shape and the outer shape, such that a user may pry apart the first and second ends of the bumper, flexing the hinge. The user then fits the bumper around the arm at any point along the major portion of the length of the arm, such that the inner shape of the bumper substantially conforms to the uniform cross-section of the arm.

In another aspect of the invention, a bumper is provided for supporting an elongate structural member above a support surface. The bumper has a body integrally molded of an elastomeric material. A hollow inner shape is formed in the body. This inner shape substantially conforms to a predetermined cross-sectional shape of the structural member. An outer periphery of the body substantially surrounds the inner shape in cross section and is spaced from it. The outer periphery contacts the support surface when the bumper is mounted around the structural member and when the bumper is being used to support the structural member above the support surface. The bumper has a plurality of outer grooves which open on the outer periphery and extend inwardly toward the inner shape. At least one living hinge is formed between one of the bottoms of these grooves and the inner shape. An opening in the body extends from the outer periphery to the inner shape. The opening spaces a first side of the body from a second side of the body when the body in in an unflexed condition. The bumper is adapted to be installed around the cross-sectional shape of the structural member by exerting prying force between the first and second sides of the body, forcing the first side away from the second side. The living hinge flexes responsive to this prying force. The cross-sectional shape of the structural member is then inserted through the opening and is seated within the inner shape of the body, the first side of the body returning to a position at the first width from the second side when the prying force is removed.

In an embodiment, there are multiple living hinges disposed in series between the first side of the body and the second side. For example, the inner shape may have a bottom opposed to the opening, a left side wall upwardly extending from the bottom and a right side wall upwardly extending from the bottom so as to be spaced from the left side wall. A left inner groove of the inner shape leftwardly extends from the left side wall toward the outer periphery and has a bottom. A right inner groove of the inner shape rightwardly extends from the right side wall toward the outer periphery and has a bottom. The outer grooves include a first outer groove having a bottom near the bottom of the left inner groove, and a second outer groove having a bottom near the bottom of the right inner groove. A first living hinge is formed by the proximity of the bottoms of the left inner groove and the first outer groove. A second living hinge is formed by the proximity of the bottoms of the right inner groove and the second outer groove. In one embodiment, the body further has formed therein third and fourth living hinges. The third living hinge is formed by the proximity of a bottom of a third outer groove to the left inner groove bottom, and the fourth living hinge is formed by the proximity of a bottom of a fourth outer groove to the right inner groove bottom.

In one embodiment, the outer periphery of the bumper has an upper portion. The outer grooves of the body include a central outer groove that extends downwardly from the upper portion toward the bumper inner shape. The inner shape has a downwardly extending finger which separates a left upper surface from a right upper surface. A left upper corner of the inner shape is formed by the left upper surface and the finger. A right upper corner of the inner shape is formed by the right upper surface and the finger. A first living hinge is formed between the bottom of the central groove and the left upper corner, while a second living hinge is formed between the bottom of the central groove and the right upper corner.

The one or more living hinges of the body permit the distortion of the elastomeric bumper body when the structural member is being inserted through the body opening and into the inner shape, without tearing.

BRIEF DESCRIPTION OF THE DRAWINGS

Further aspects of the invention and their advantages can be discerned in the following detailed description as read in conjunction with the drawings of an exemplary embodiment, in which like characters denote like parts and in which.

DETAILED DESCRIPTION

As used herein, "front" and "forward" connote a direction toward the windshield and the front of a vehicle, and "rear" and "rearward" connote a direction away from the windshield and toward the vehicle interior.

Figure 1:
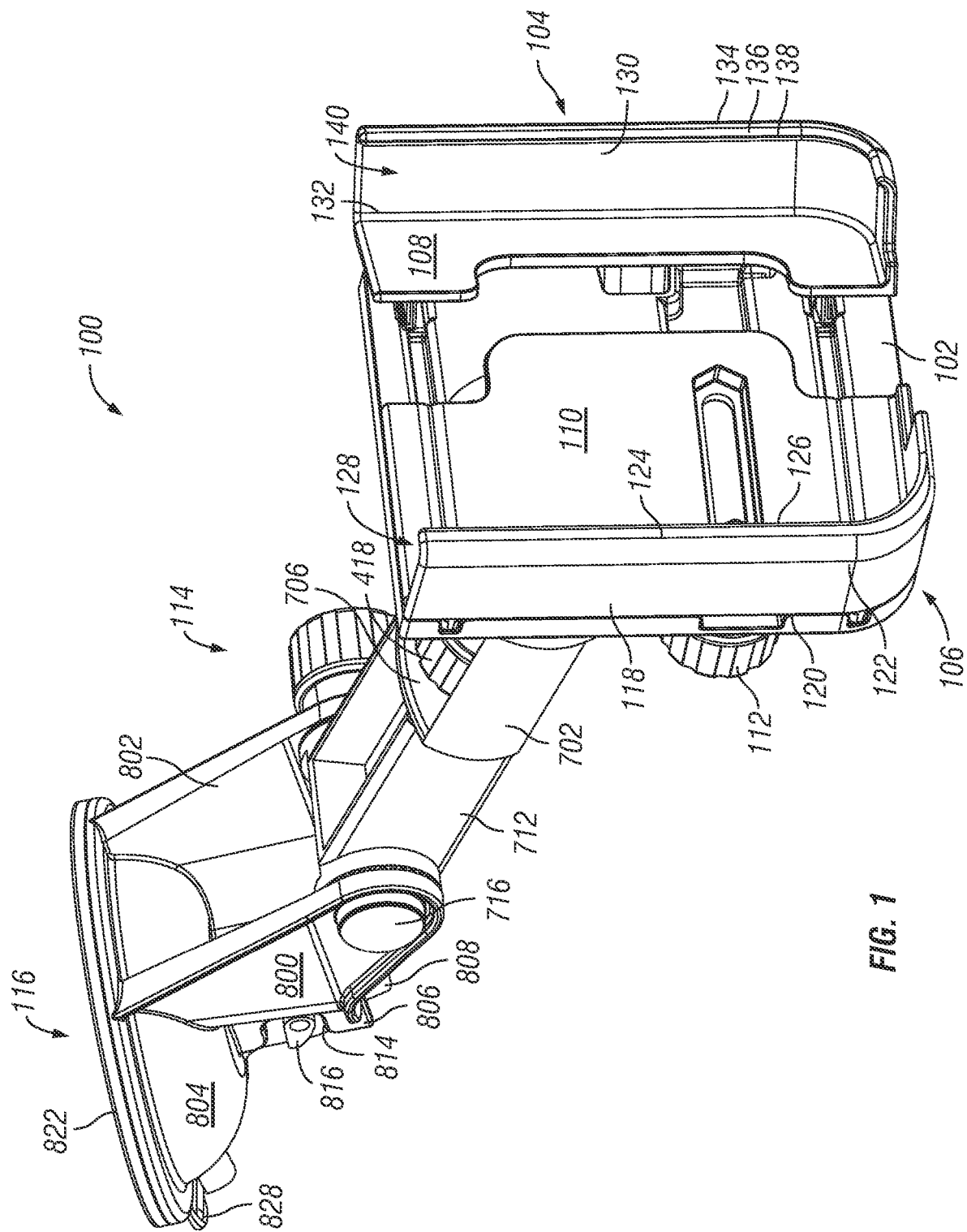
FIG. 1 is a perspective view of a mount according to the invention, from a rear and side direction, jaws of the mount being in an intermediate position relative to each other, a first jaw being rotated to an open or release configuration.

A personal electronic device windshield mount is indicated generally at 100 in FIG. 1. The mount is useful for holding any of a number of relatively small, flat, typically handheld electronic devices, including cell phones, tablets, audio players, map displays, personal digital assistants and the like. The invention will be described in conjunction with a mobile phone, also called a "smart phone" or a cell phone. These phones typically are rectangular, have heights that greatly exceed their widths, and thicknesses that are small fractions of their widths. Recent cell phones have a display that takes up the entire front surface of the phone.

The mount 100 has a base 102 to which are articulably mounted a first (right) jaw 104 and a second (left) jaw 106. Jaw 104 has a support plate 108, while jaw 106 has a support plate 110. In the illustrated open or release configuration, support plate 110 is residing in a first plane, while support plate 108 is residing in a second plane that is rearwardly and inwardly tilted relative to the first plane. The support or back plates 108 and 110 support a back surface of the cell phone. In the illustrated embodiment, the rear surface of base 102 and plate 110 of left jaw 106 substantially occupy planes that are parallel to each other. In the "open" or "release" configuration, the held device (not shown in this figure) may be removed in a rearward direction orthogonal to the plane of support plate 110.

In the illustrated embodiment, jaws 104 and 106 move with respect to base 102 in different ways. Jaw 106 may laterally (that is, side-to-side or in a direction at right angles to the front and rear directions) slide toward and away from jaw 104, but will always reside in the same plane. Jaw 104 does not slide in this embodiment, but instead rotates about an axis that is parallel to the first and second planes. In this embodiment, the jaw 106 slides with respect to base 102, and may be affixed to base 102, after slidable adjustment, by means of a clamping bolt or screw 112. Jaw 104, on the other hand, is hinged to or pivots relative to the base 102.

In other embodiments, the positions of rotating jaw 104 and sliding jaw 106 could be reversed, so that the rotating jaw is disposed on the left side, while the sliding jaw is disposed on the right side. A mount with such reversed jaw positions may be more suitable for left-handed users, as the installation of the device into and extraction of the device from the mount may be done with one hand. In another embodiment, two rotating jaws could be provided. In even another alternative embodiment, one jaw could be entirely fixed while the other jaw both rotates and slides.

The base 102 is spherically, or otherwise rotationally, mounted to a rearward end of an elongate attachment arm 114. The attachment arm 114 extends forwardly from the base 102 to a surface affixation member 116, which may be a suction cup suitable for attachment by partial vacuum to a glossy surface such as the interior surface of a windshield.

In view of the fact that windshields tilt upwardly and rearwardly by varying degrees based on the make and model of the vehicle, different models of the mount 100 could be provided with any of a number of arms 114 of different lengths, and/or different surface affixation members 116 that make different angles to the arms 114.

Figure 18:
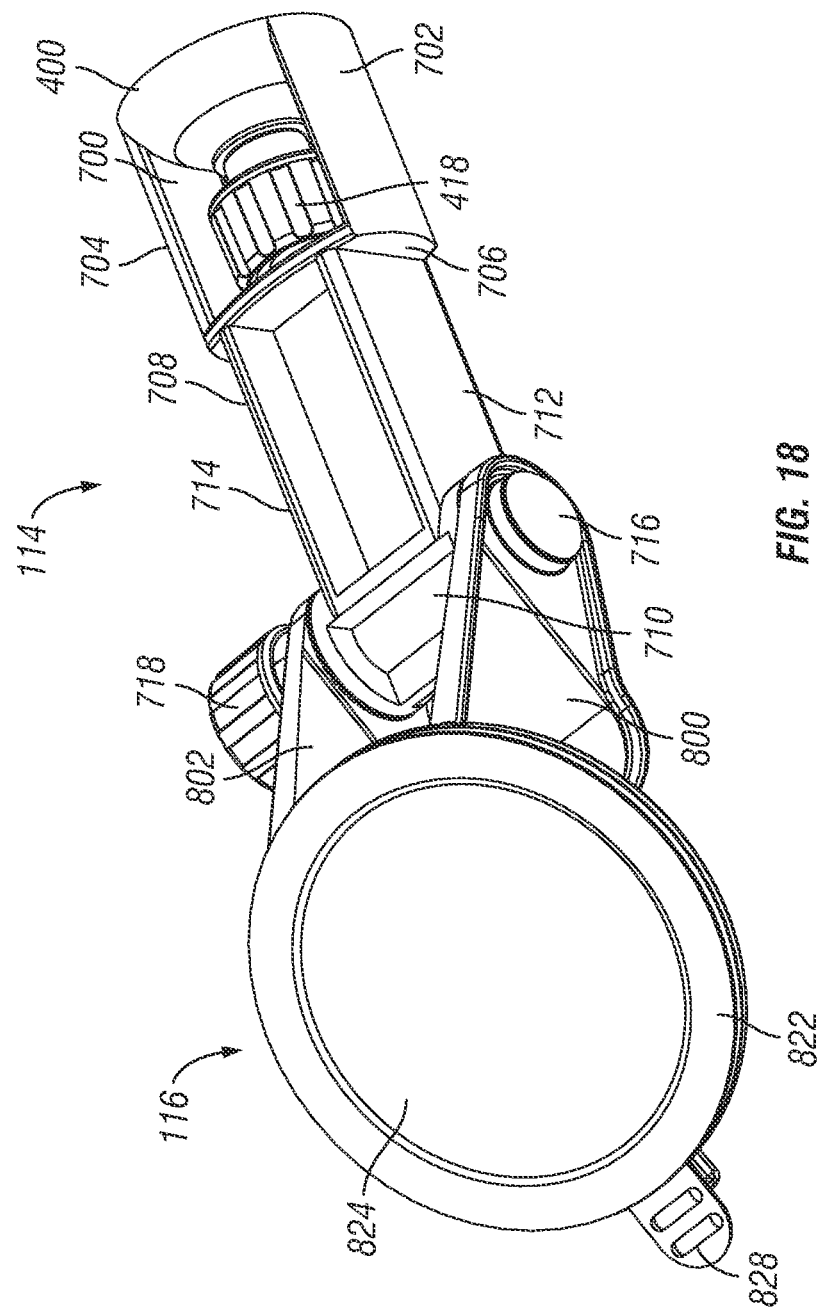
FIG. 18 is a perspective detail, taken from above, of attachment arm and suction cup assemblies for use with the invention.
Figure 19:
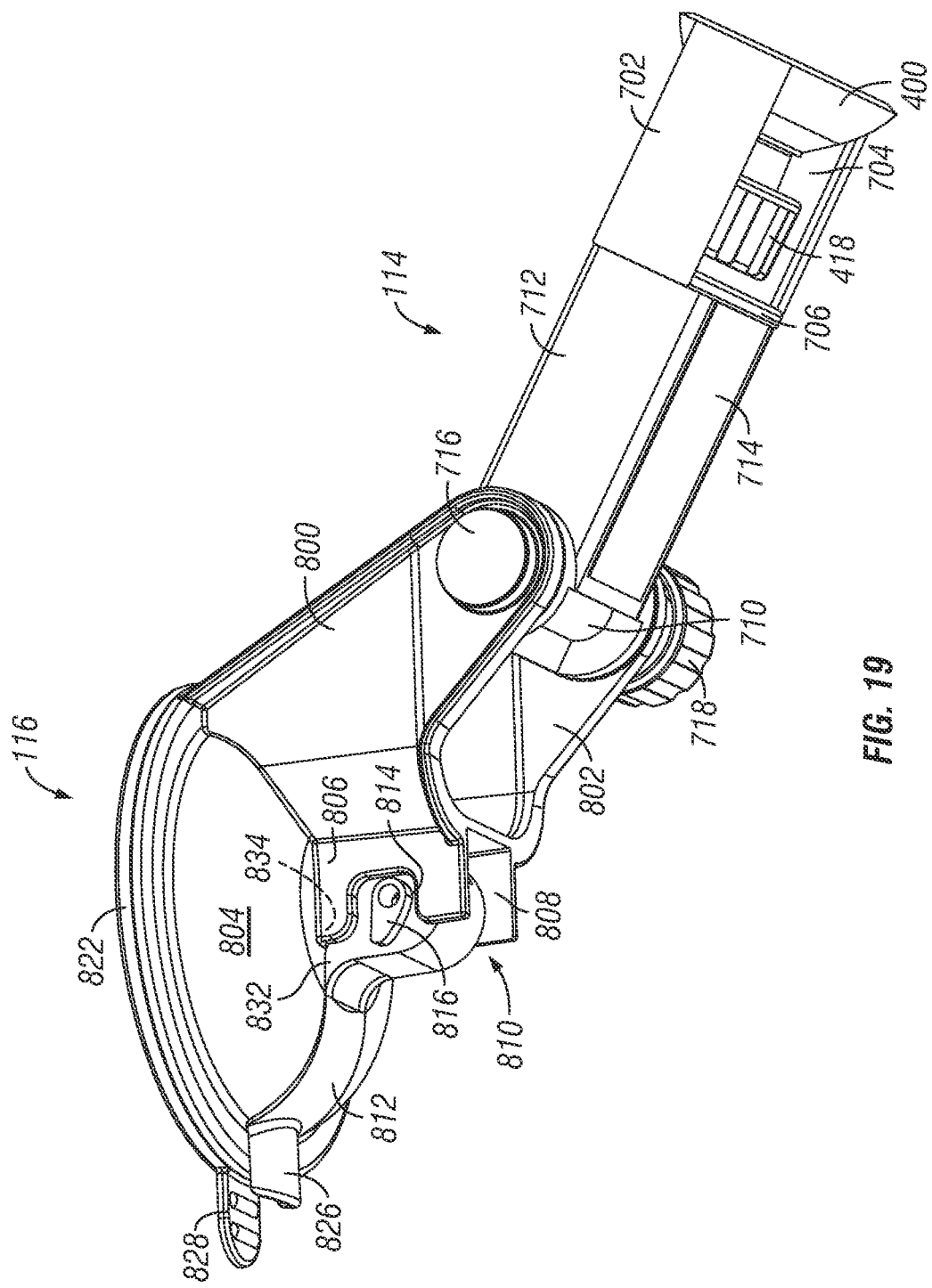
FIG. 19 is a perspective detail, taken from below, of the attachment arm and suction cup assemblies shown in FIG. 18.
Figure 20:
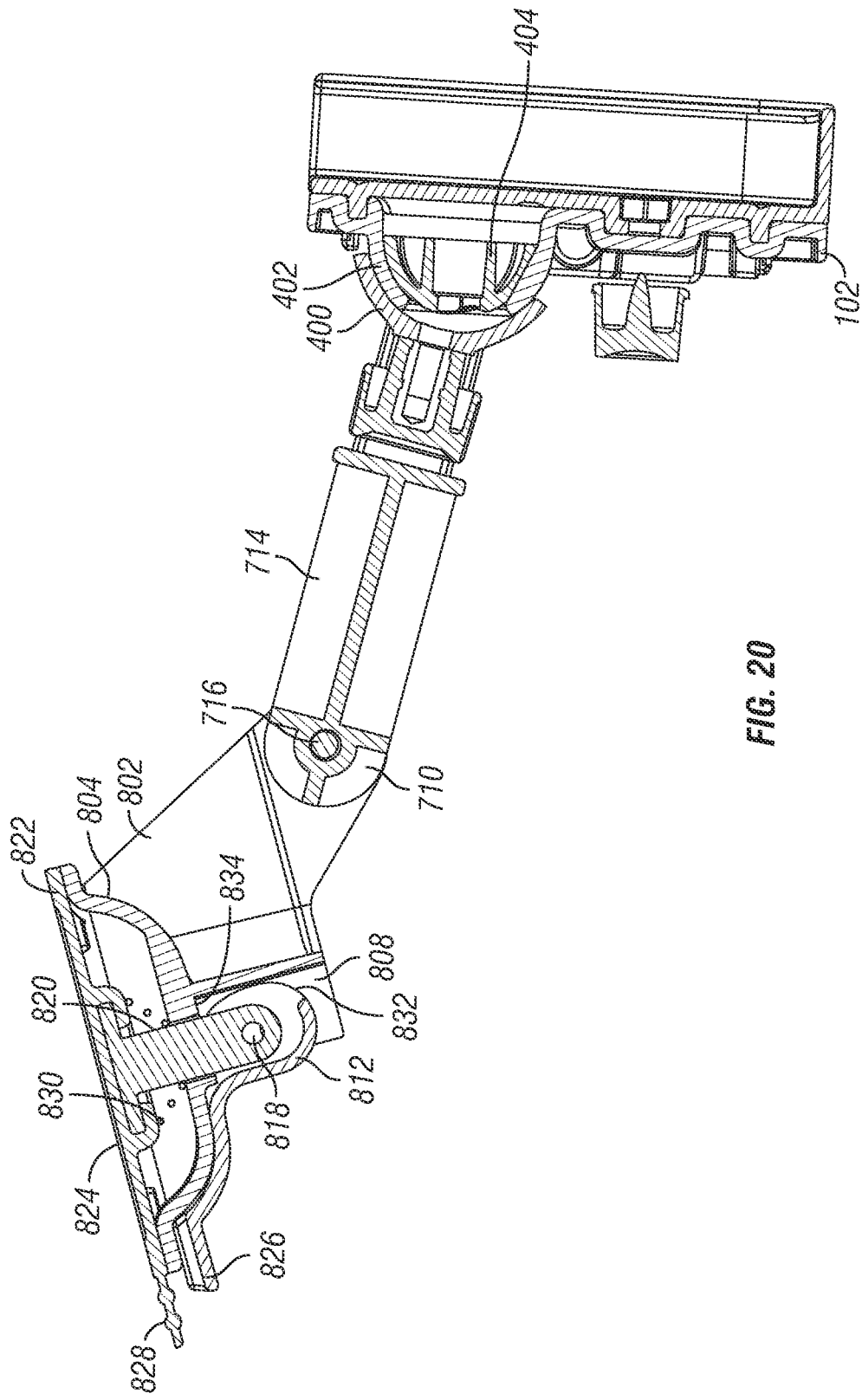
FIG. 20 is a sectional view taken substantially along an axis of the attachment arm and suction cup assemblies shown in FIGS. 18 and 19.

FIGS. 18-19 are perspective details of a representative attachment arm assembly 114 which could be used with the invention, as joined to a suction cup assembly 116 which also could be used with the invention. Attachment arm assemblies and suction cup assemblies other than those illustrated could be used, such as those described in FIGS. 21-30. FIG. 20 is a sectional view of the attachment arm and suction cup assemblies shown in FIGS. 18-19. The exploded view of FIG. 4 also supplies details of the arm assembly 114 and the suction cup assembly 116.

The rear end of the illustrated attachment arm assembly 114 takes the form of a cup or partial sphere 400 (FIG. 4), the rearwardly facing concave surface of which will act as a portion of a ball joint, as will be later described. A knob 418 for a ball joint clamp (further described below) is housed within a space 700 bounded by a first leg 702 and a second leg 704. Legs 702 and 704 are spaced apart from each other and are long enough to house the knob 418 even where knob 418 has been unscrewed on its bolt shaft (described below) to a loose position. Space 700 intentionally is open to the top and bottom so as to permit the fingers of the user to tighten or loosen knob 418.

The rear ends of legs 702 and 704 are joined to the cup 400, as by being integrally molded with it. Legs 702 and 704 are parallel to each other and to an axis of the arm assembly. The legs 702 extend forwardly to and are joined to a transverse plate 706. A further section 708 of the arm assembly 114 extends forwardly from the plate 706 to a pivot housing 710. Section 708 can take any convenient form. In the illustrated embodiment, the section 708 consists of two spaced-apart parallel members 712 and 714. The members 712 and 714, and legs 702 and 704, may be wider in a vertical direction than they are in a horizontal direction, thereby better supporting the combined weight of the cell phone mounting bracket and cell phone mounted on the rearward end of the arm.

The pivot housing 710 forms a transverse bore that accepts the shaft of a carriage bolt 716. A knob 718 is screwed onto the shaft threads of the carriage bolt 716. The suction cup assembly 116 may include two parallel, spaced-apart wings 800 and 802. Rearward ends of the wings 800 and 802 have circular holes through them that each accept the shaft of the carriage bolt 716. Wing 800 is disposed between the head of carriage bolt 716 and pivot housing 710, while wing 802 is disposed between the pivot housing 710 and the knob 718. Housing 710 and bolt 716 form a pivot around a transverse axis, allowing the angular adjustment of arm assembly 114 with respect to suction cup assembly 116.

As best seen in FIG. 19, the wings 800 and 802 are parallel to each other, are transversely spaced apart and are much taller than they are wide. Wings 800 and 802 extend forwardly until they are joined to a suction cup dish member 804. The dish member is hollow in an upward-forward direction (FIG. 20) and is rigid. A plate 806 extends forwardly from wing 800 and downwardly from dish 804, and a plate 808 extends forwardly from wing 802 and downwardly from dish 804. The parallel plates 806 and 808 define therebetween a slot 810 that receives a camming lever 812. The plate 806 has a forwardly open u-shaped surface 814 that acts as a camming surface against which a cam 816 is in contact. Cam 816 is formed to transversely outwardly extend from the general vertical surface of camming lever 812, so as to interact with camming surface 814. The right plate 808 has a similar camming surface 809 formed in it (FIG. 3), and a cam 817 similar to cam 816 extends from the right face of camming lever 812 to interact with it.

As seen in FIG. 20, a lower end of the camming lever 812 has a hole therethrough that accepts a pin 818. The pin 818 in turn is threaded through hole(s) of a bottom end of a rod 820. The rod 820 is positioned substantially along the axis of dish 804, and extends upwardly and forwardly through a hole in dish 804 until it is joined by any suitable means a rearward surface of an elastomeric disk 822. A conical spring 830 (FIG. 4) may be inserted to be coaxial with and disposed around the rod 820, with a larger-diameter end thereof facing the disk 822 and a smaller-diameter end thereof contacting the inner surface of dish 804.

In FIGS. 18-20, camming lever 812 is in a closed position, in which an upper surface 824 of the disk 822 adheres by partial vacuum to the inner side of a glass windshield or other glossy surface. In the closed position, the rod 820 is displaced downwardly and rearwardly along the suction cup axis. It is forced into this position by the action of cam 832 against the lower/rearward surface 834 of the dish member 804. In an alternative embodiment, the displacement is caused or assisted by cam 816 acting against camming surface 814. Prior to the attachment by the user to the windshield, the user rotates camming lever 812 downward and rearward, to the position shown in FIG. 4. This pushes the rod 820 upwardly and forwardly, and upwardly and forwardly displaces the disk 822, making it flat or more shallow. After the disk 822 has been placed against the windshield, a free end 826 of the camming lever 812 is swung upwardly and forwardly, displacing the rod 820 rearwardly and downwardly and creating a partial vacuum between surface 824 and the windshield. A tab 828 may radially extend from the disk 822 as an aid to later remove the suction cup assembly 116 from the windshield.

Returning to FIG. 1, a side plate 118 of the left jaw 110 extends rearwardly from a left end 120 of the second support plate 110 to an end 122 of the side plate 118. A lip 124 of the left jaw 110 extends from end 122 inwardly, in parallel to support plate 110, to a lip end 126. The second support plate 110, side plate 118 and lip 124 form a channel 128 that in combination cages or holds a left lateral side of the cell phone.

Similarly, a side plate 130 of right jaw 104 extends rearwardly from a right end 132 of the first support plate 108 to a rearward end 134. A right lip 136 extends from end 134 inwardly, in parallel to support plate 108, and generally toward channel 128, to a lip end 138. The first support plate 108, side plate 130 and lip 136 form a channel 140 which, in a first or "closed" configuration, will cage a right lateral side of the cell phone.

Figure 2:
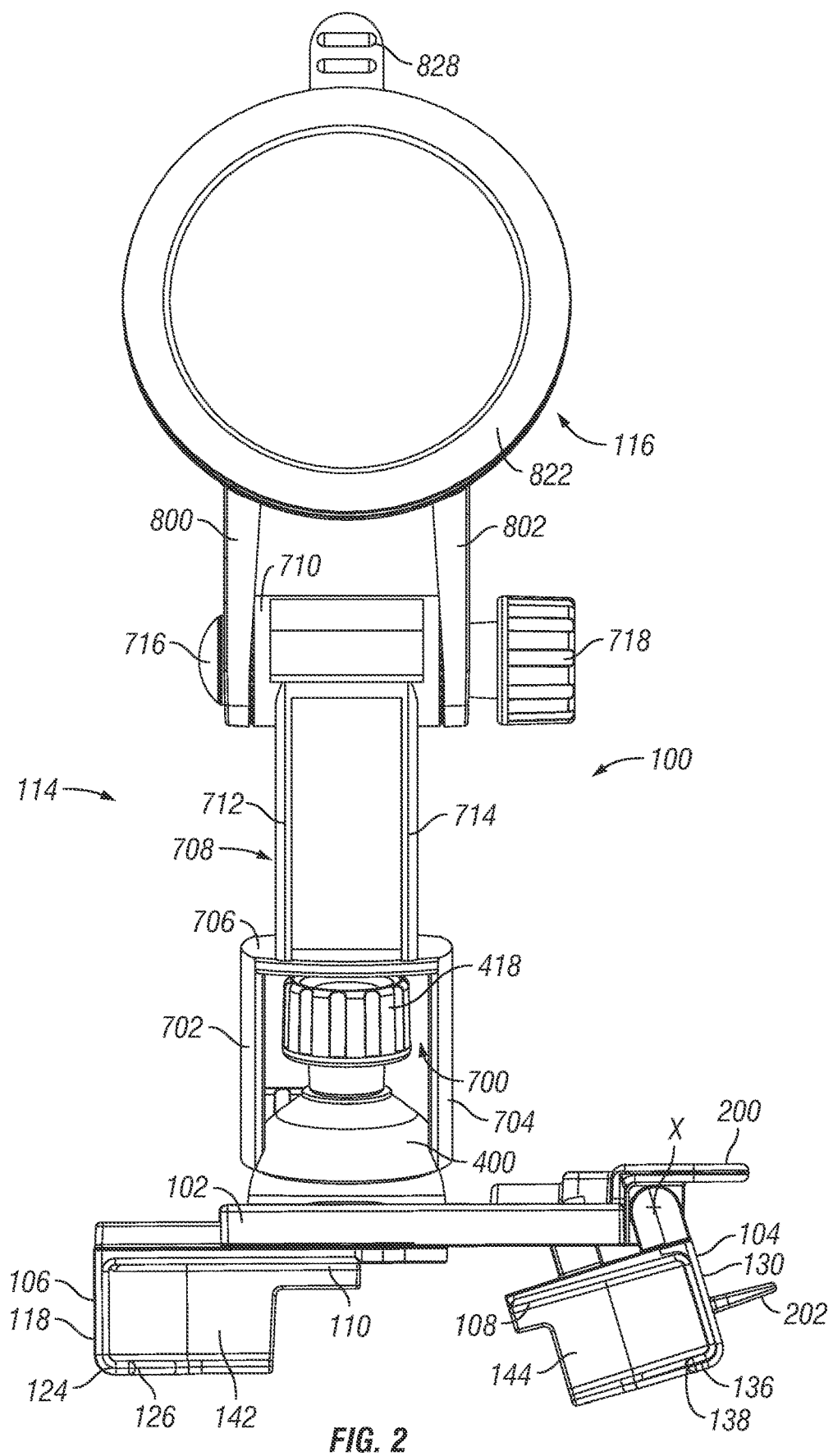
FIG. 2 is a top view of the mount as configured in FIG. 1.

In the top view of FIG. 2, there can be seen a bottom plate 142 that is joined to second support plate 110, second jaw side plate 118, and lip 124. Bottom plate 142 supports part of the weight of the cell phone being held. Similarly, a bottom plate 144 is joined to first support plate 108, right jaw side plate 118 and lip 136. Bottom plate 144 also supports part of the weight of the cell phone, in both the open configuration shown and in the closed configuration. Bottom plates 142, 144 can be considered to be horizontal portions of the respective left and right channels 128 and 140.

A first external finger tab 200 is affixed to, and rightwardly extends from, the base 102. A second external finger tab 202 is affixed to, and rightwardly extends from, side plate 130 of pivoting jaw 104. The finger tab 200 may reside in a plane parallel to the first plane, which then will be orthogonal to the rearward direction. The finger tab 202 may reside in a plane parallel to the plane occupied by first support plate 108, and will rotate around axis X, with support plate 108, as a unit. In the illustrated embodiment, the finger tab 200 is integrally molded as a part of base 102, while finger tab 202 is integrally molded as a part of right jaw 104. Arm 114, base 102, left jaw 106 and right jaw 104 may be separately injection-molded using a tough plastic such as ABS. The right jaw 104 is an example of a cell phone holding element that can assume a closed configuration in which the cell phone is securely held, and an open configuration in which the cell phone may be easily removed from the mount by the user.

The finger tabs 200 and 202 are sized and positioned to be pinched together with the thumb and one finger of one hand of the user, such as the right hand. The user applies pressure with the thumb to a rearward surface of tab 202, and applies pressure with e.g. the index finger to a forward surface of tab 200. The moment arms to these tab surfaces are such that a user will easily be able to overcome the detenting force keeping the first jaw in the closed configuration (described below), and rotate jaw 104 to the open configuration shown, which also is detented.

Figure 3:
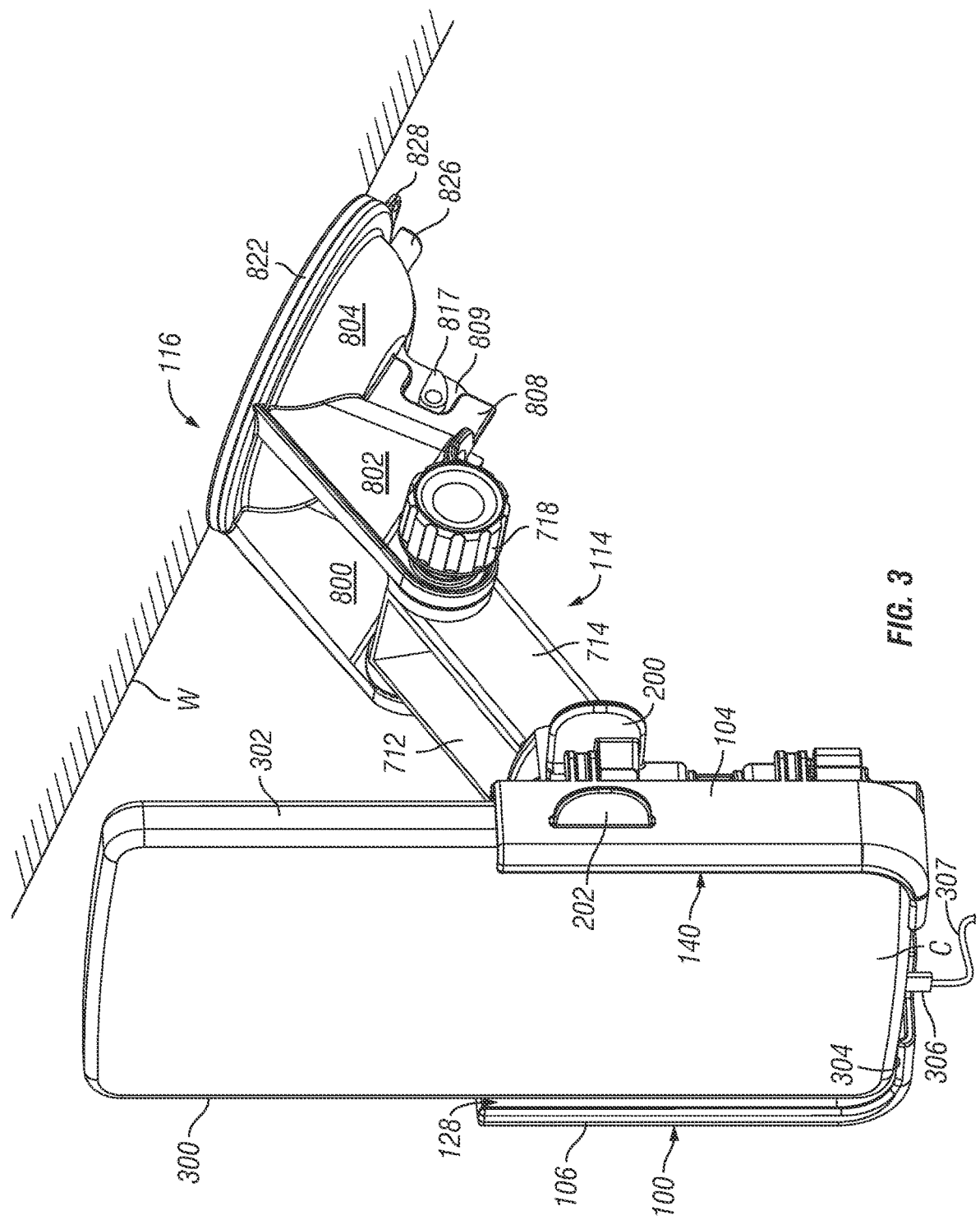
FIG. 3 is a perspective right side view of a mount according to the invention, as affixed to a slanting windshield and as holding a cell phone, the first jaw being rotated to a closed configuration.

In FIG. 3, a cell phone C has been mounted to the interior surface of a windshield W by means of the mount 100. Mount 100 is in the closed configuration in which the cell phone C may not be removed from the mount 100 in a rearward direction, i.e., horizontally away from windshield W. Since the windshield W extends over and rearwardly relative to the cell phone C, the cell phone C may not be removed from mount 100 in an upward direction, either. In the closed configuration, a left lateral side 300 of cell phone C is caged by left jaw channel 128, while a right lateral side 302 of cell phone C is caged by right jaw channel 140. In use, jaws 104 and 106 are open in a vertical direction. Except where windshield W or like surface obstructs this movement, the cell phone C is freely insertable into and removable out of the jaws 104 and 106 in the vertical direction.

Figure 6:
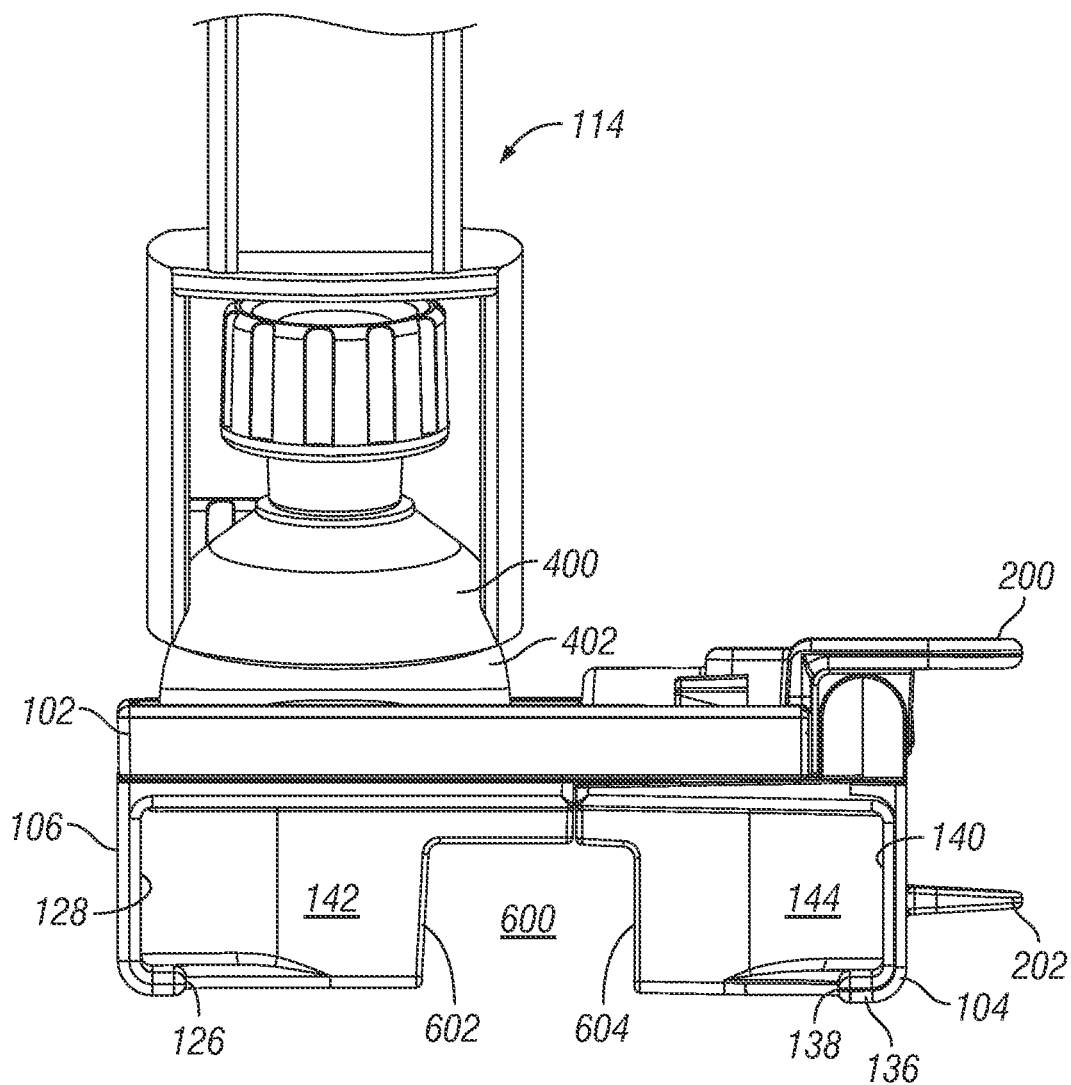
FIG. 6 is a top view of the mount as configured in FIG. 6.

Contemporary cell phones have a power/communications port in the center of a bottom side 304 of the cell phone. A plug 306 such a firewire plug is inserted into this port. To accommodate plug 306 and the flexible cable 307 attached to it, and as is best shown in FIG. 6, a U-shaped bottom opening 600 persists between left jaw 106 and right jaw 104 even when the jaws 106, 104 are in their minimum-width position. The opening 600 is defined by an inner margin 602 of left bottom plate 142 and, continuing from margin 602, an inner margin 604 of the right bottom plate 144. The provision of opening 600 means that the cell phone C (FIG. 3), as having a power/communications cable 307 plugged into it, may be installed into or removed from mount 100 as a unit.

Figure 4:
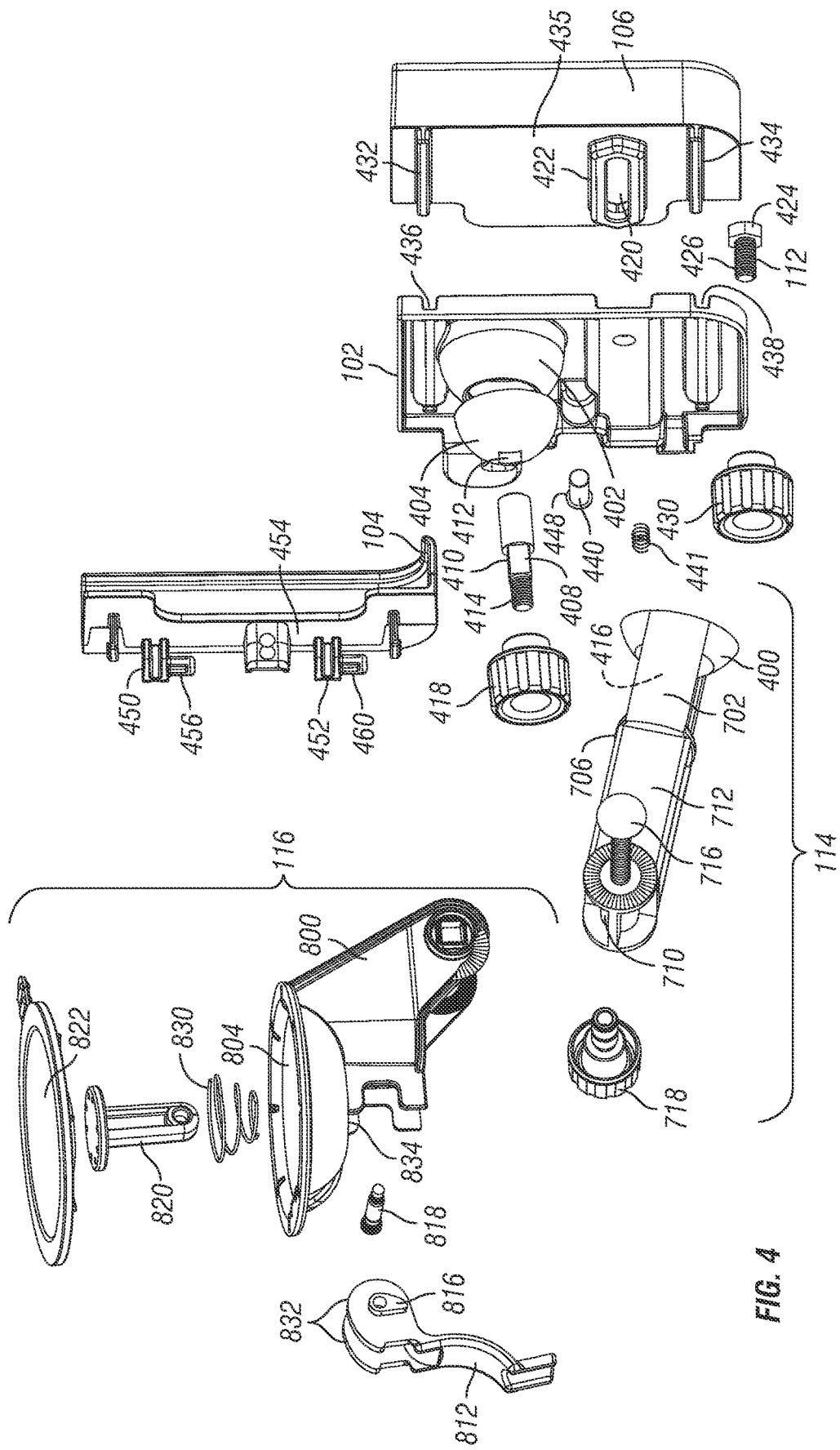
FIG. 4 is an exploded view of the mount shown in FIGS. 1-3.
Figure 4A:
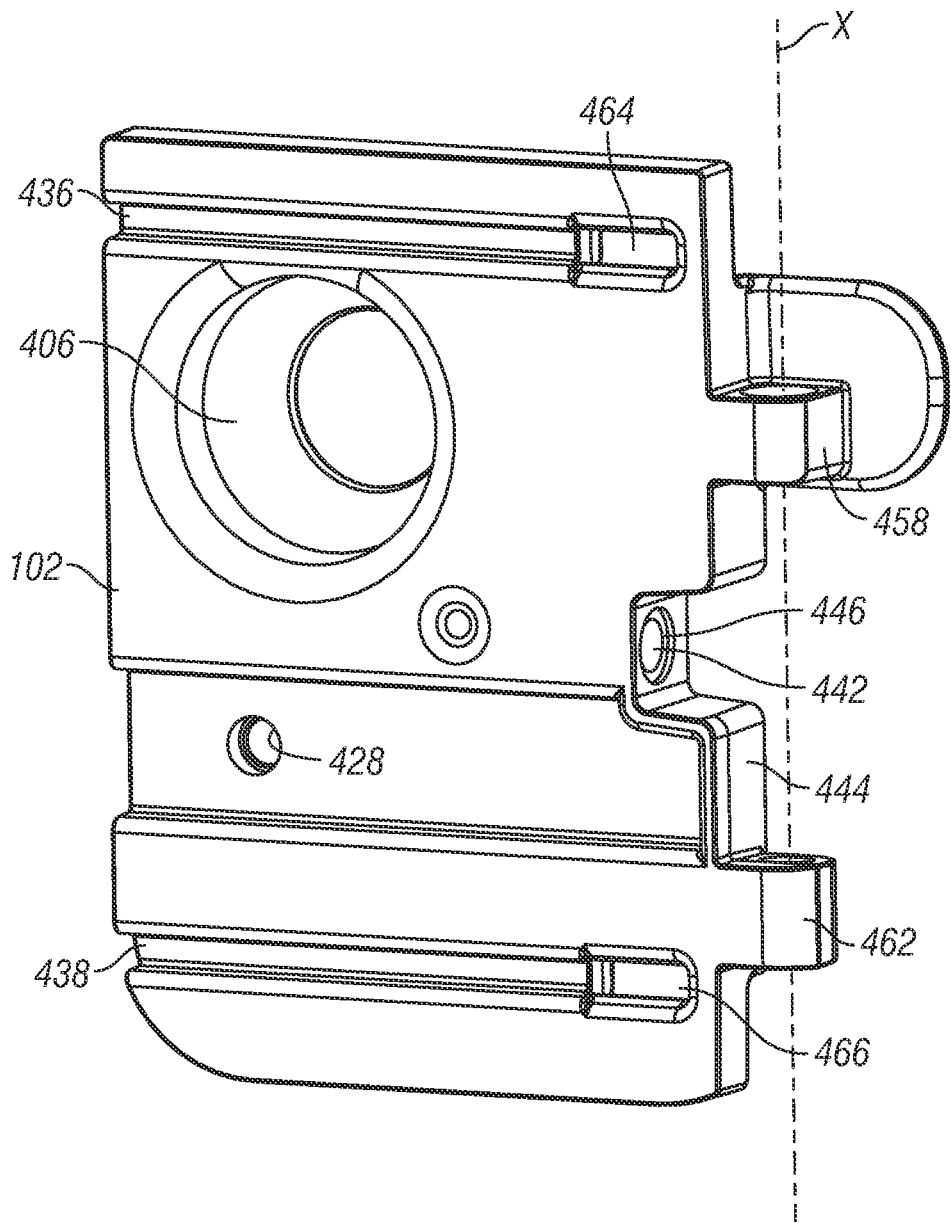
FIG. 4A is a rear view detail of a base plate as disassembled from the mount shown in FIGS. 1-3.

As shown in FIGS. 4 and 4A, the rearward end of attachment arm 114 takes the form of a partial sphere 400. The concave interior surface of sphere 400 fits to the front spherical surface 402 of the base 102. A spherical member 404 rides on a rear spherical surface 406 of the base 102 (FIG. 4A). A square portion 408 of a screw shaft 410 is inserted, in a frontward direction, through a square hole 412 in the spherical member 404. The square hole 412 prevents the spherical member 404 from spinning on surface 402 upon tightening of knob 418. Threads 414 of screw shaft 410 will protrude forwardly beyond the spherical member 404. The screw shaft 410 is then inserted through hole 416 of the partial sphere 400. A knob 418, which may have a metal threaded insert, is then threaded onto exposed threads 414.

Parts and surfaces 400-418 form a ball and socket joint. The arm 114 may be rotated on surface 402 to any of a number of positions relative to the base 102, and the selected position can then be clamped in place with knob 418.

The left jaw 106 has an elongate, laterally extending slot 420. A frontwardly recessed region 422 (FIG. 5), with rear-to-front walls that are parallel to the slot 420, receives a hex head 424 of the clamping screw 112. A shaft 426 (FIG. 4) of the clamping screw 112 is inserted through slot 420 and then through hole 428 in the base 102 (FIG. 4A). A knob 430, which may have a threaded metal insert, is then screwed to the exposed threads of shaft 426 to clamp in place the left jaw 106 to the base 102.

A pair of rails 432, 434 (FIG. 4) are formed on a front surface 435 of the jaw 106. Rails 432 and 434 are elongate in a lateral direction, are parallel to each other, and fit within respective channels 436 and 438 of the rear surface of base 102 (FIG. 4A). The rails 432 and 434 and the channels 436 and 438 help constrain jaw 106 to a laterally sliding movement relative to base 102.

A cylinder 440 (FIG. 4) contains a helical detenting spring 441 that spring-loads a detenting ball 1000 (FIG. 10) to partially protrude out of the cylinder 440. The cylinder 440 is press-fit into a socket 442 (FIG. 4A) opening on a right side 444 of the base 102. The socket 442 has an annular recess or countersink 446 that receives a flange 448 of the cylinder 440.

Figure 12:
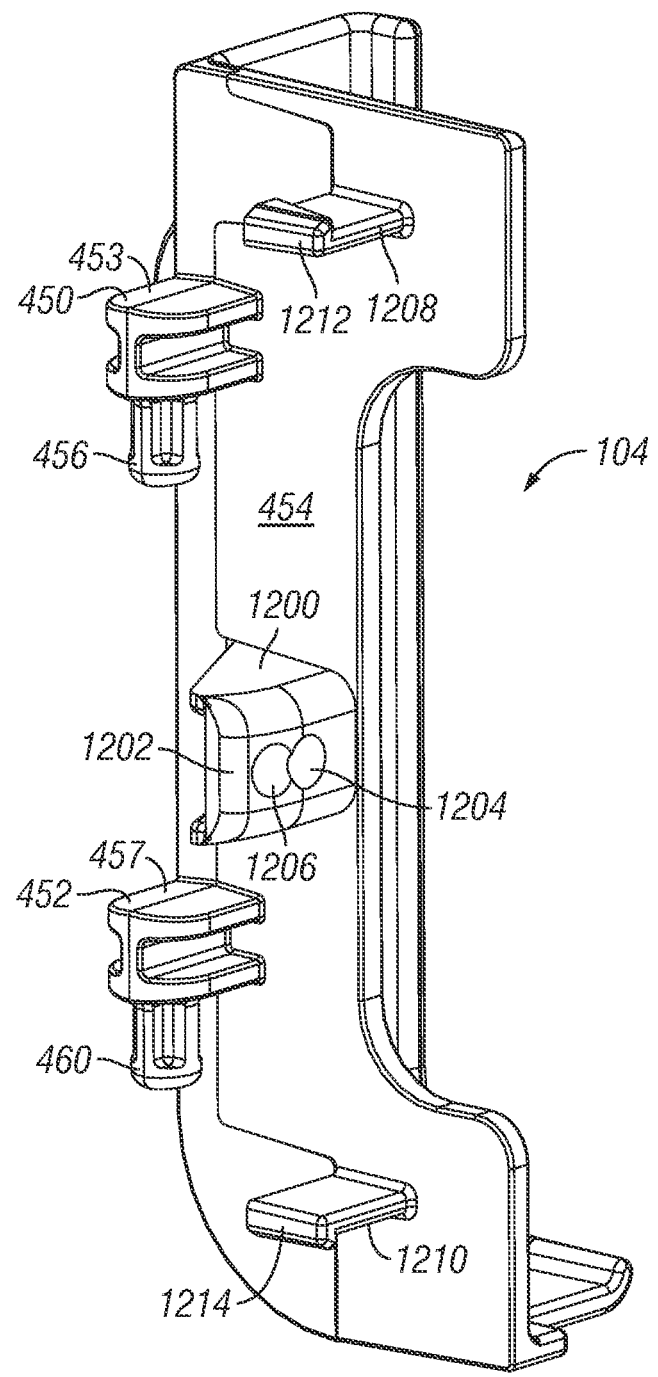
FIG. 12 is a front perspective detail of the first jaw prior to assembly to a base plate of the mount.

As seen in FIG. 12, the right jaw 104 has an upper pin 450 and a lower pin 452 that are preferably integrally molded with the jaw 104. Pin 450 has a shaft-bearing member 453 that extends forwardly from a forward surface 454 of the jaw 104. A shaft 456 of pin 450 downwardly extends from an end of shaft-bearing member 453 to be received within upper socket 458 (FIG. 4A) formed at the right side 444 of the base 102. A shaft-bearing member 457 (FIG. 12) of pin 452 extends forwardly from surface 454 at a position downwardly displaced from pin 450. A shaft 460 of pin 452 downwardly extends from an end of shaft-bearing member 457 to be received within lower socket 462 formed at the right side 444 of the base 102 (FIG. 4A). The bores of sockets 458 and 462 are disposed on axis X and permit pin shafts 456 and 460, and the rest of jaw 104, to rotate around axis X.

Figure 5:
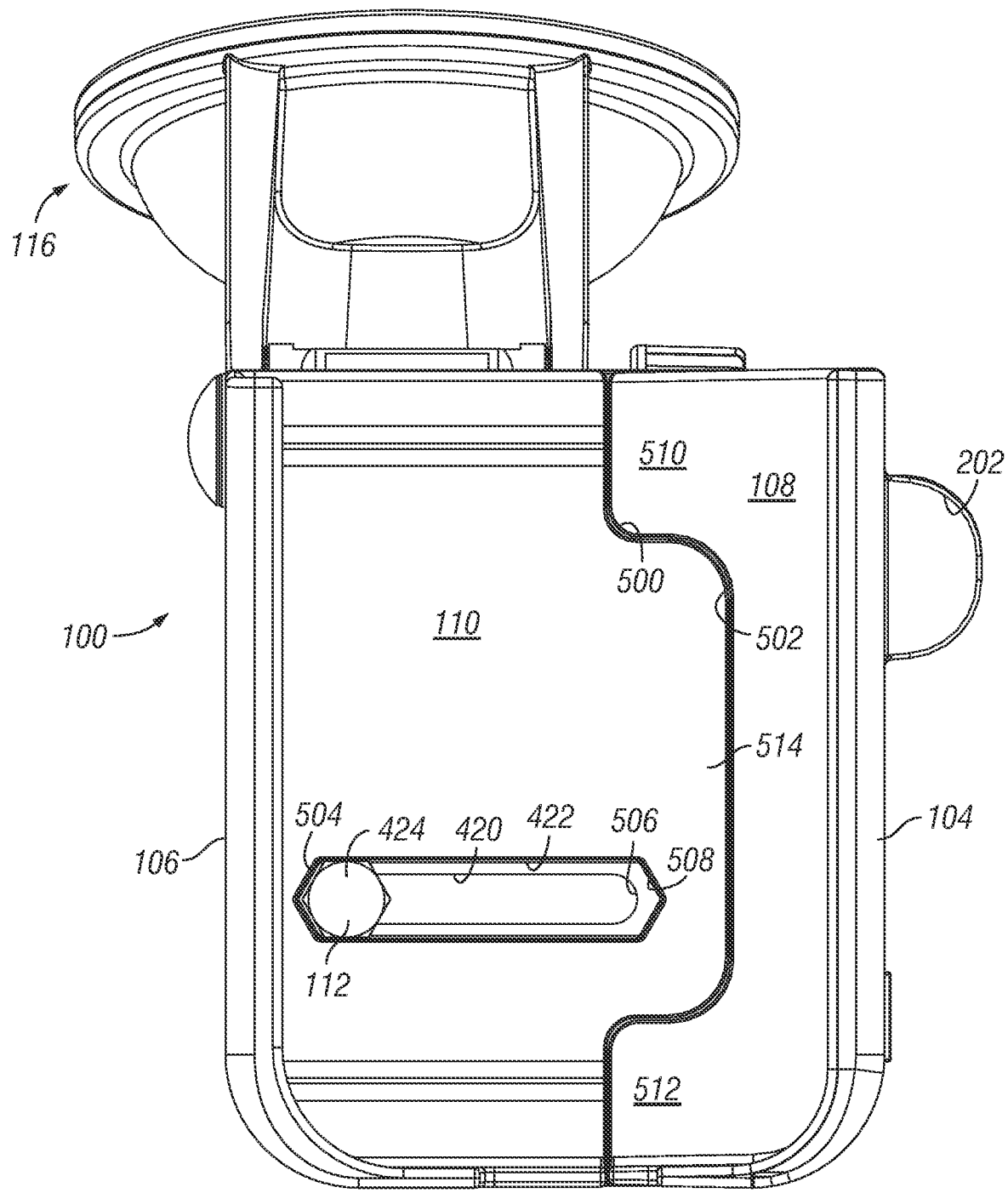
FIG. 5 is a rear view of the mount shown in FIG. 1, with first and second jaws defining a minimum width between them, and the first jaw being rotated to a closed configuration.

As seen in FIG. 5, when the mount 100 is in its narrowest-width position, a right margin 500 of support plate 110 mates with or abuts a left margin 502 of support plate 108. The edges of hex bolt head 424 abut the left end 504 of slot recess 422. Slot 420 and recess 422 extend rightwardly to respective right ends 506 and 508. In order to accommodate a longer slot 420, and therefore an enhanced range of cell phone widths capable of being mounted, the margins 500, 502 are not straight. In another embodiment, they could be. In the illustrated embodiment, margin 502 creates a first, upper interior tab 510 in the upper region of support plate 108, and a second, lower interior tab 512 in a lower region of the support plate 108. As will be further described below, it is these tabs 510, 512 which will contact the back of the cell phone to push it out of a caged condition, and it will be these tabs 510, 512 which will be pressed frontward by the back of the cell phone to induce the rotation of jaw 104 to the closed configuration. The non straight right margin 500 of support plate 110 creates a rightward-extending central lobe 514 that surrounds the right ends 506, 508 of respective slot 420 and recess 422.

Figure 7:
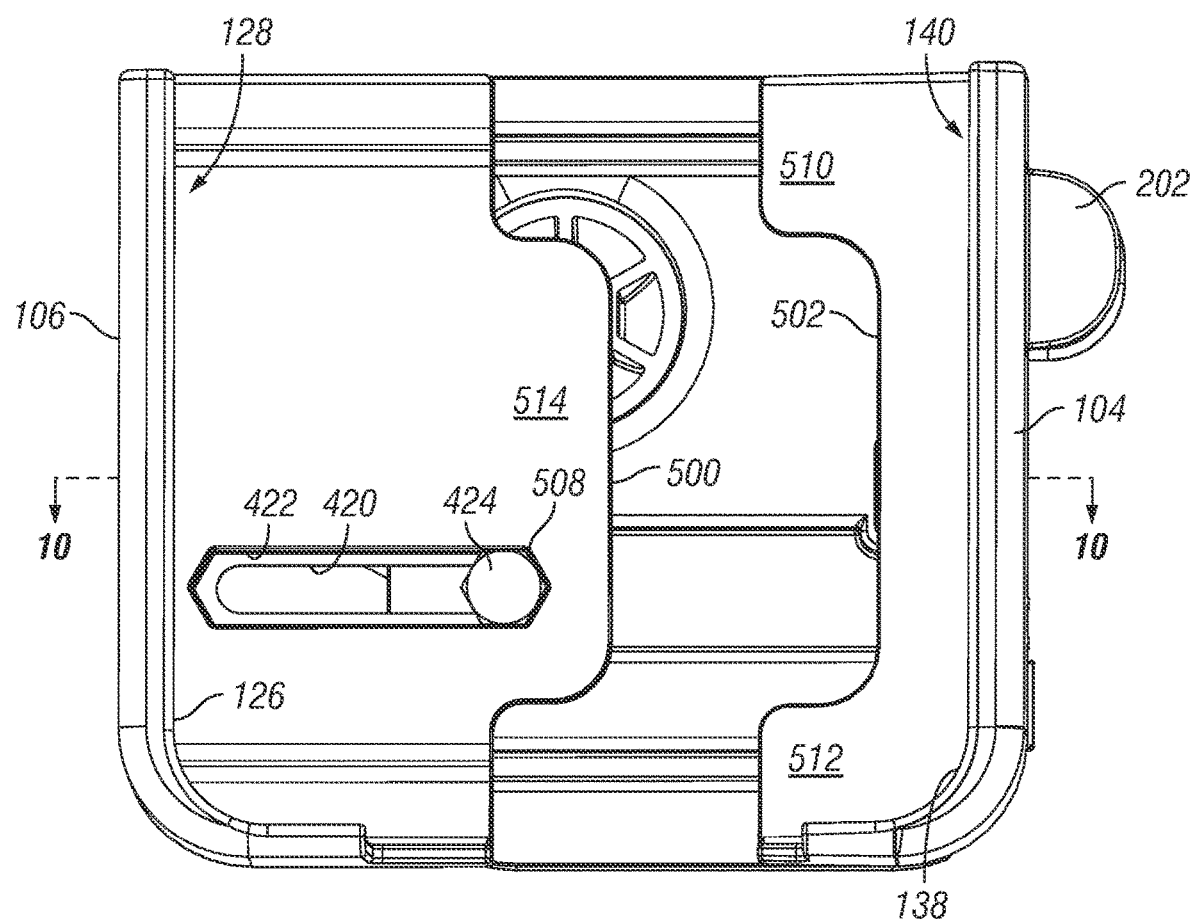
FIG. 7 is a rear view of the mount shown in FIG. 1, with first and second jaws in a maximum width position relative to each other, and the first jaw rotated to a closed configuration.

In FIG. 7, the left jaw 106 has been slid to its maximum-width position, in which the left channel 128 is farthest away from right channel 140. The edges of hex bolt head 424 abut the right end 608 of slot recess 422. In other embodiments, the maximum distance between channel 128 and channel 140 could be further increased, so as to allow the installation of the cell phone in a "landscape" configuration.

Figure 8:
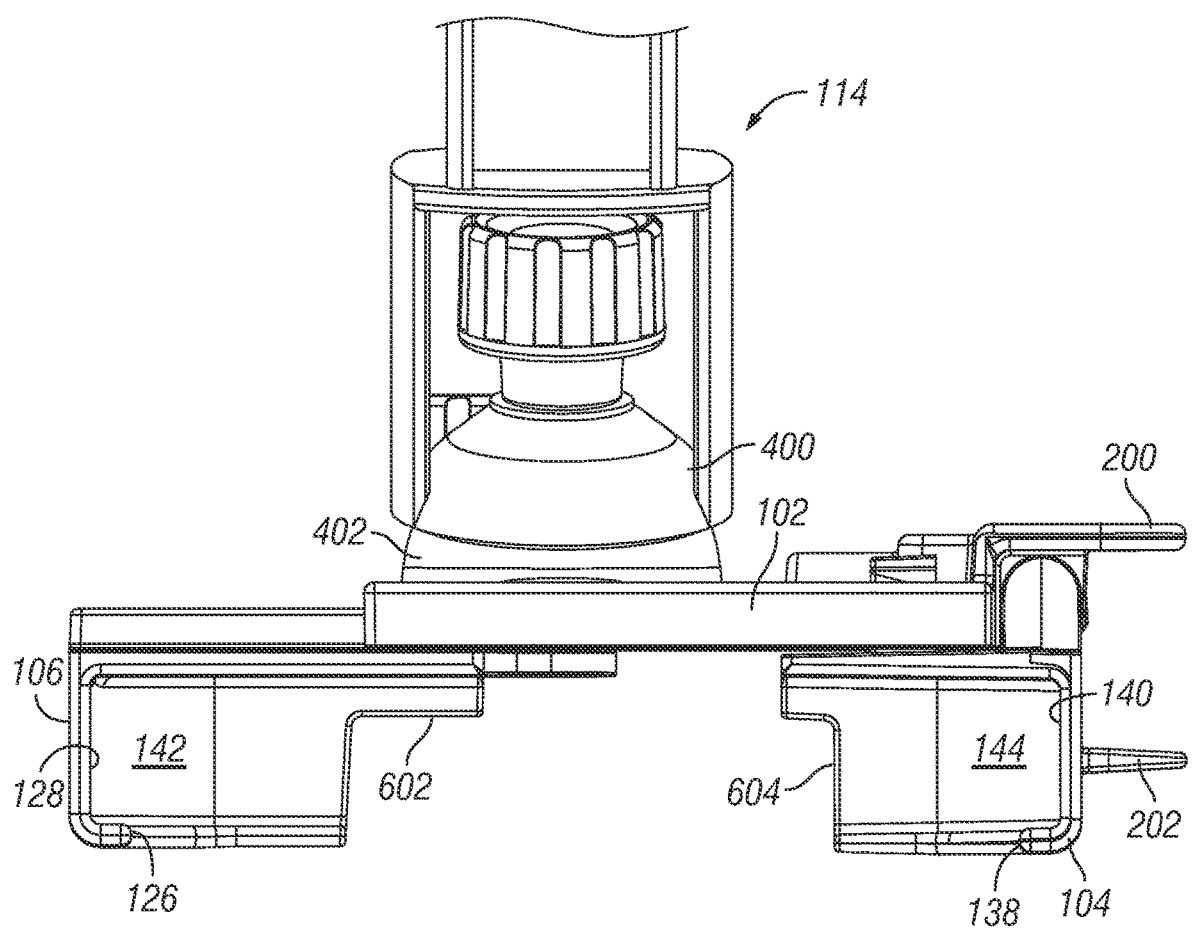
FIG. 8 is a top view of the mount as configured in FIG. 7.
Figure 9:
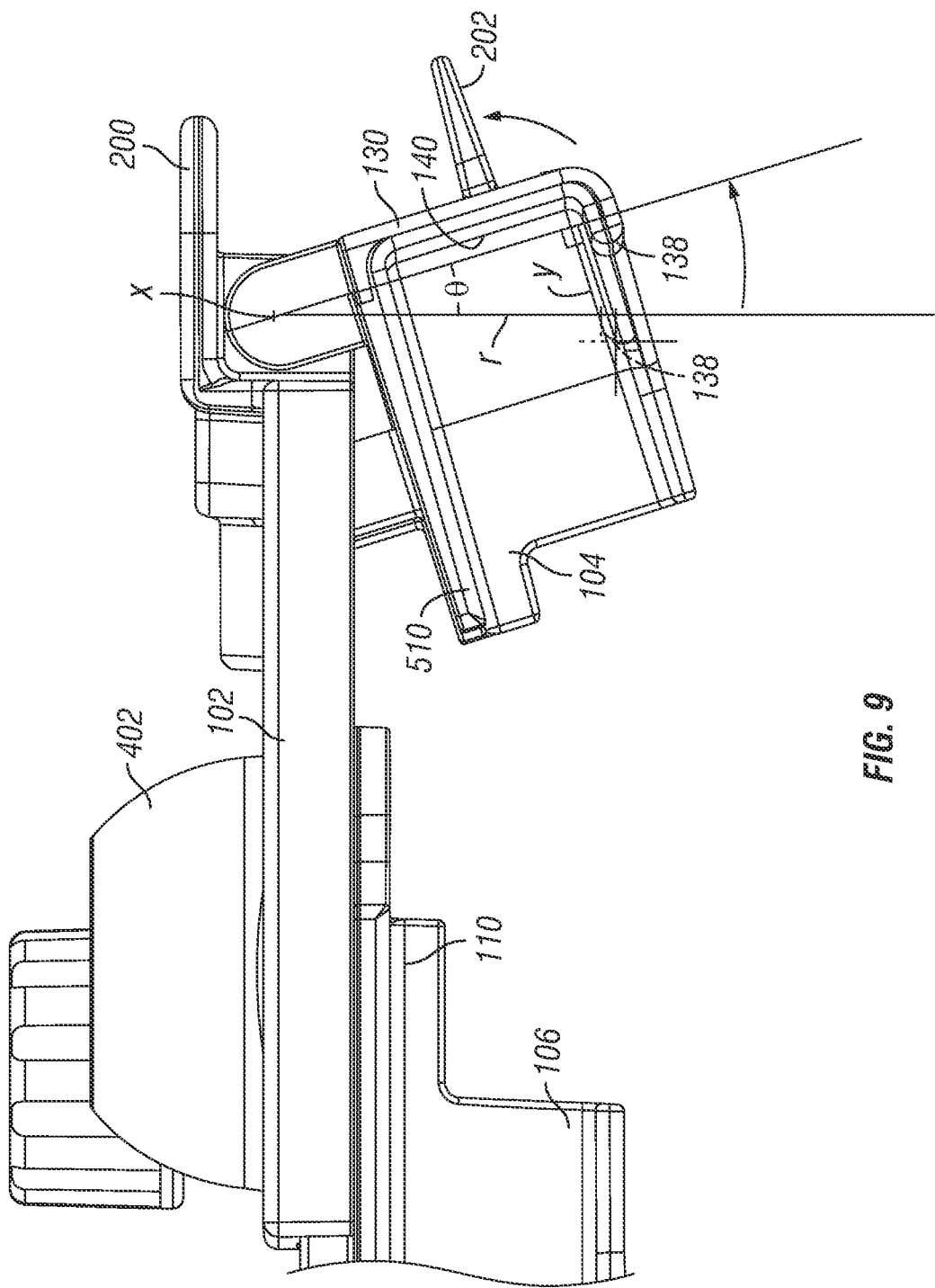
FIG. 9 is a top view detail of the mount in which first and second jaws are in a maximum width position relative to each other, and wherein the first jaw has been rotated to an open or release configuration, a portion of the first jaw in the closed configuration being drawn in dotted line.

In FIG. 9, the jaw 104 has been rotated by an angle θ from a closed configuration, in which side plate 130 is perpendicular to the first plane (occupied by second support plate 110; see FIG. 8), to an open configuration, in which lip end 138 has been swung laterally outwardly around axis X. If the radius from axis X to lip end 138 is r, and if the depth of channel 140 is defined by the distance of lip end 138 to the inner surface of side plate 130, then the sine of angle θ should be at least the ratio of the channel depth to radius r. With the proportions shown, θ should be at least about five degrees. In the illustrated embodiment, θ is about sixteen degrees.

Figure 10:
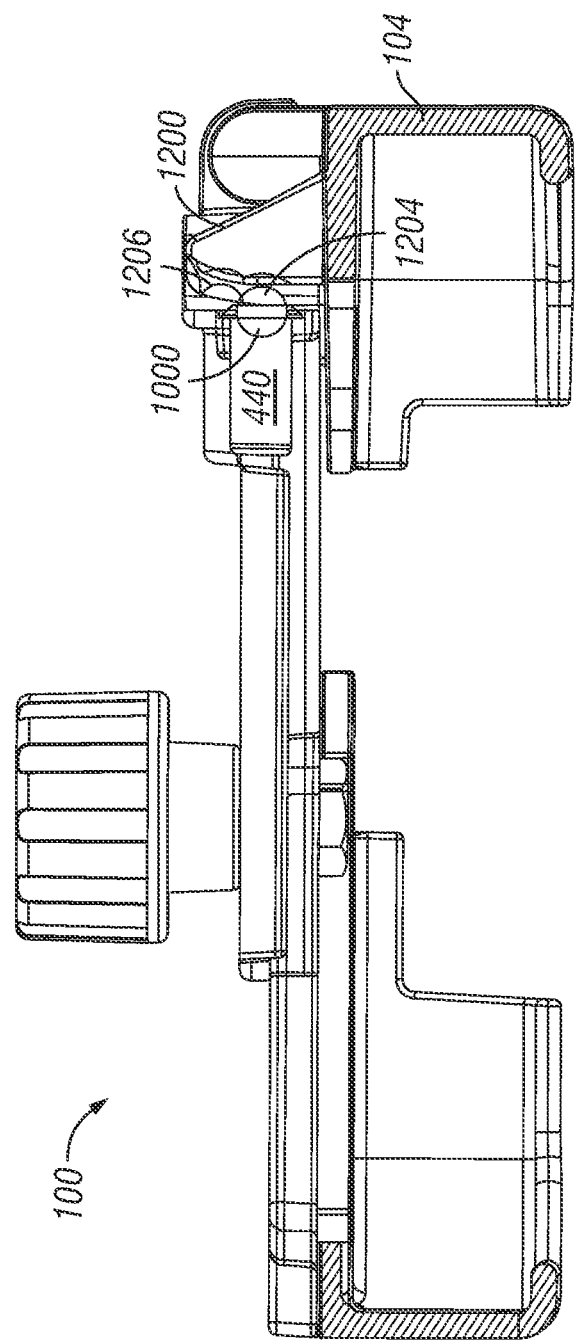
FIG. 10 is a horizontal sectional view taken substantially along Line 10-10 of FIG. 7.
Figure 11:
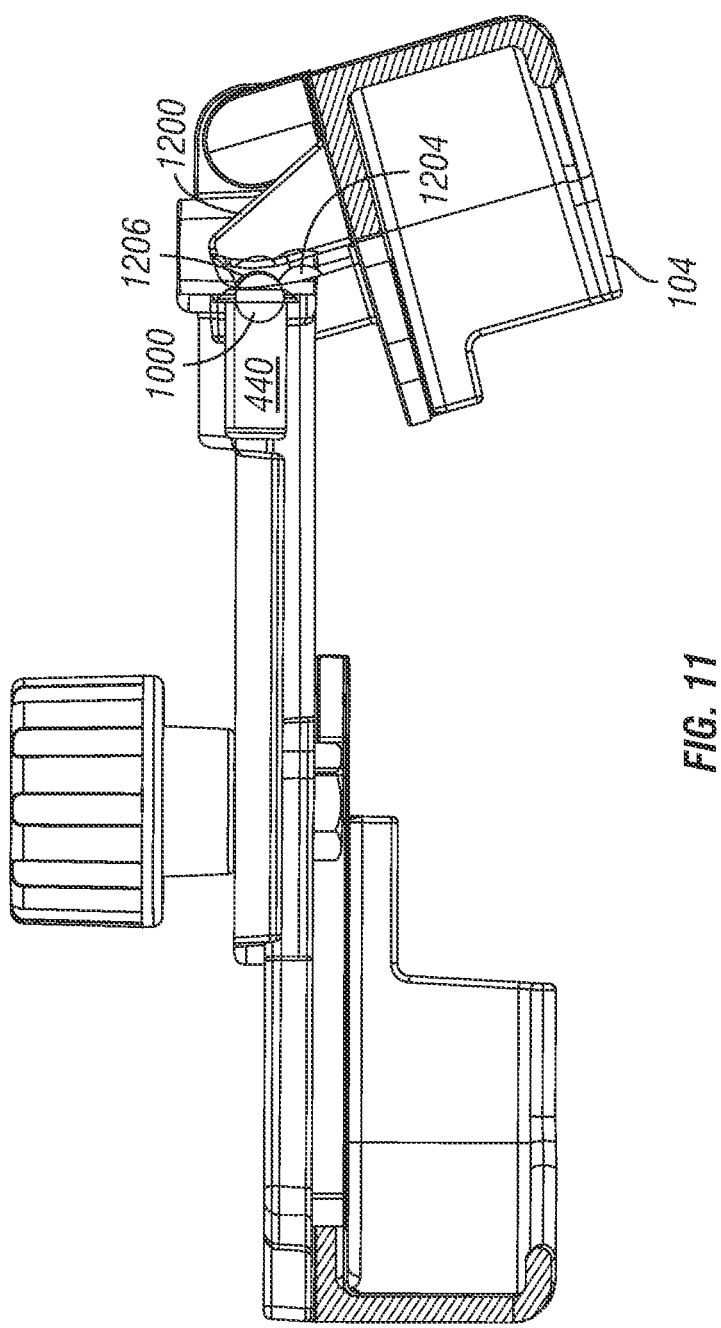
FIG. 11 is a horizontal sectional view taken on the same plane as that used for FIG. 10, but showing the first jaw as rotated to an open or release configuration.

In one embodiment, a detenting structure indexes the open and closed configurations of the jaw 104. One such detenting mechanism is shown in FIGS. 10-12. A camming member 1200 (FIG. 12) forwardly extends from a general front surface 454 of jaw 104. The camming member has an inwardly-facing convex camming surface 1202 with a first concave detenting surface 1204, and, immediately forward of or overlapping the first detenting surface 1204, a second concave detenting surface 1206. In FIG. 10, a detenting ball 1000 has been cammed into concave detenting surface 1204 by the spring 441 housed in cylinder 440 (FIG. 4). This detents jaw 104 to the closed configuration. In FIG. 11, the detenting ball 1000 has been cammed into concave detenting surface 1206 by the detenting spring 441. This detents jaw 104 to the open or release configuration. The detenting mechanism, through an audible and tactile sensation, tells the user when he or she has achieved either configuration. Further, the detenting mechanism ensures the that the chosen configuration will remain until consciously changed by the user. In an alternative embodiment (not shown), the detenting structure shown in FIGS. 10-12 could be reversed. The spring-loaded ball 1000 could be carried on the pivoting jaw 104, while a concave-shaped camming surface could be molded as a part of base 102. In other embodiments, the detenting structure could incorporate another pressuring element such as a leaf spring instead of a spring-loaded ball. The detenting structure creates a resistance to rotation of jaw 104 when the jaw 104 is at either detented position. The user must exert at least a predetermined amount of force to escape either detented position.

FIG. 12 also illustrates upper and lower retention tabs 1208, 1210 that forwardly extend from the general forward surface 454 of jaw 104. Upper retention tab 1208 has a terminal barb 1212 while lower retention tab 1210 has a terminal barb 1214. During assembly of the mount, the barb 1212 of upper retention tab 1208 is snapped forwardly through an upper retention tab hole 464 (FIG. 4A), while the barb 1214 of lower retention tab 1210 is snapped forwardly through a lower retention tab hole 466. Once the barbs 1212, 1214 have been inserted through holes 464 and 466, they will prevent easy withdrawal of tabs 1208 and 1210. The purpose of retention tabs 1208 and 1210 is to limit the degree to which jaw 104 can be swung out. Tabs 1208 and 1210 effectively prevent jaw 104 from being swung out beyond the open configuration detented position.

Figure 13:
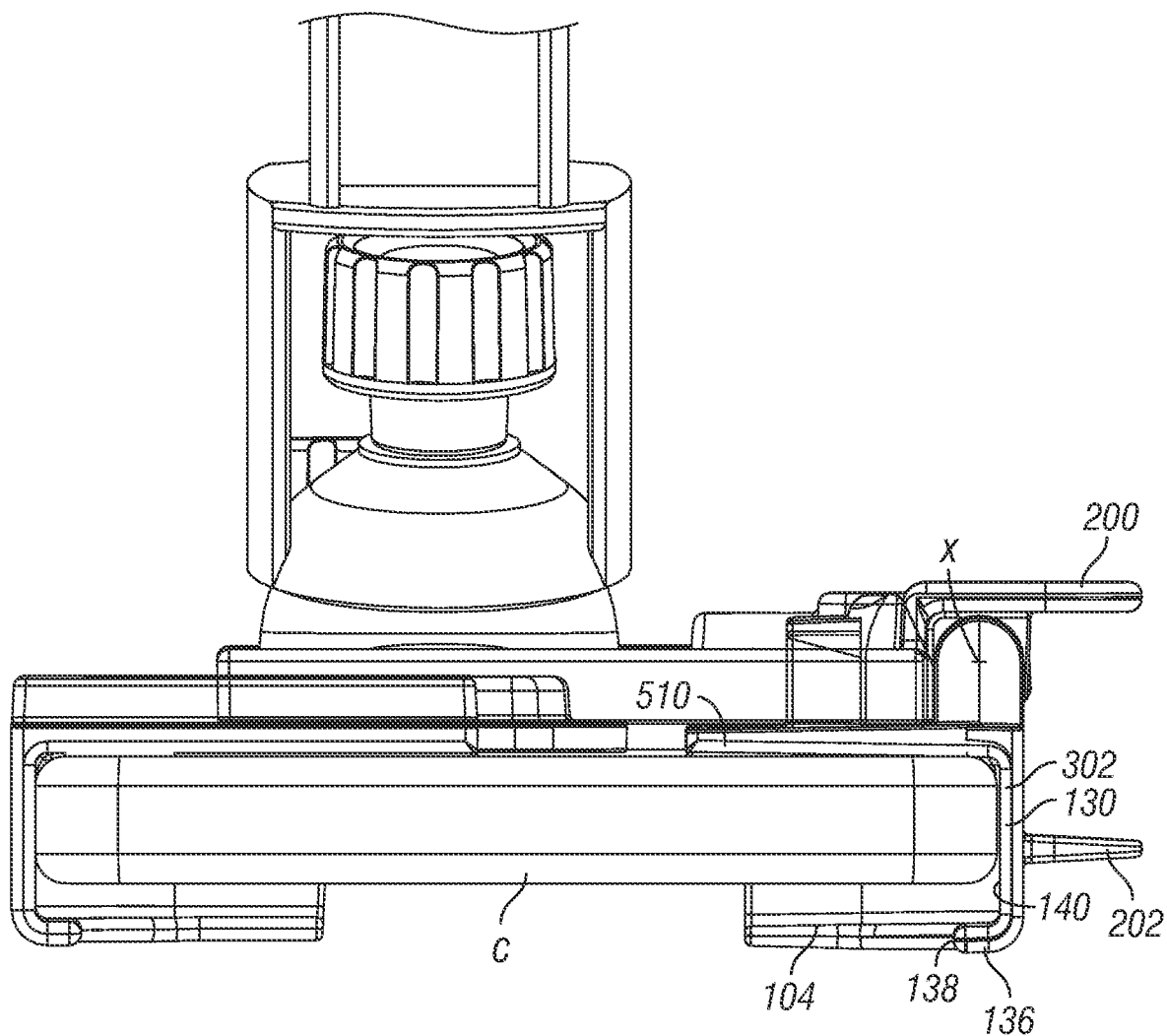
FIG. 13 is a top view detail of the mount as holding a cell phone, the first jaw having been rotated to a closed configuration.

In FIG. 13, a right lateral side 302 of cell phone C has been "caged" by channel 140, since jaw 104 is in its closed configuration. In this posture, the lip 136 will prevent the removal of cell phone C in a rearward direction (toward the bottom of the page in this FIGURE).

Figure 14:
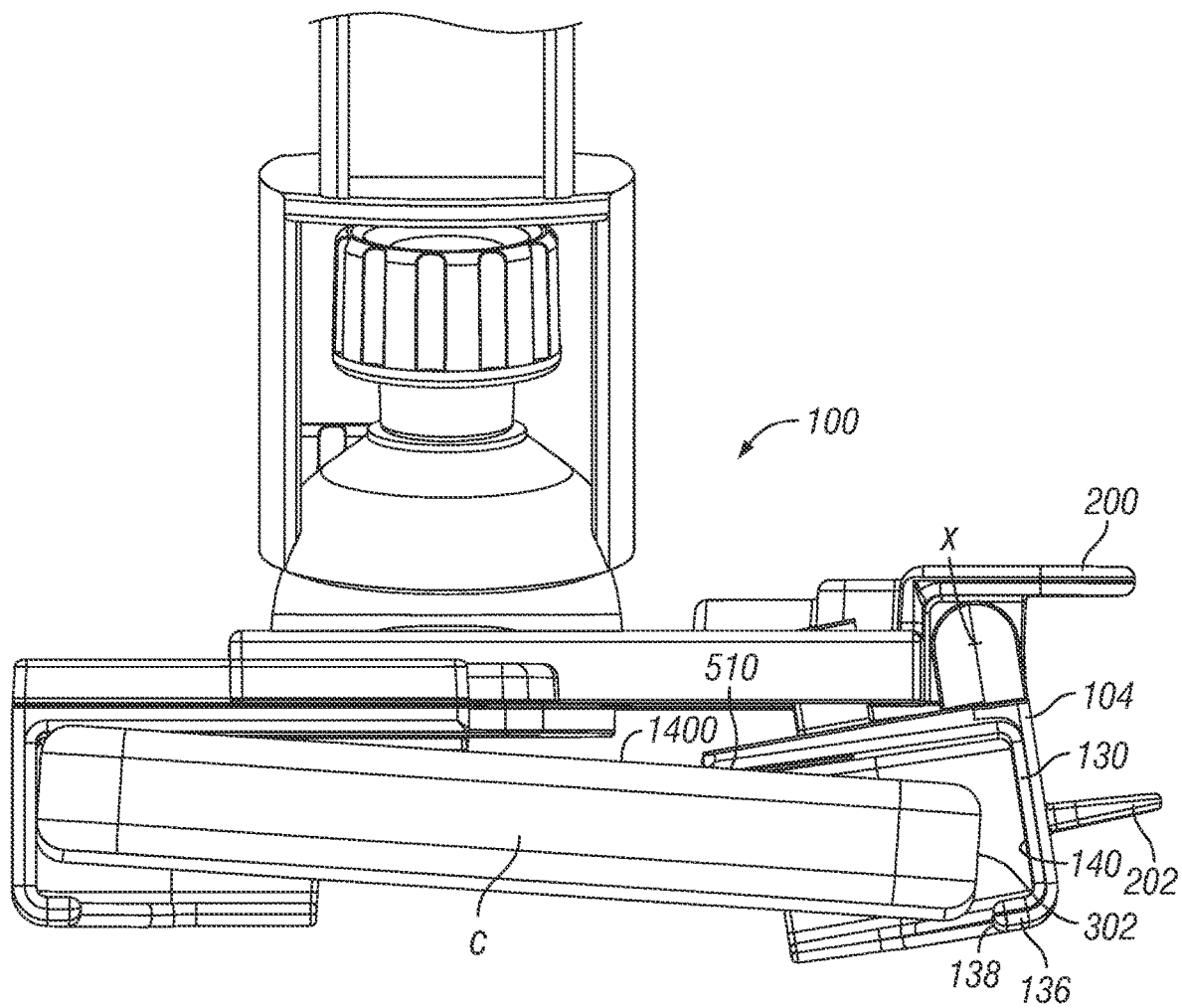
FIG. 14 is a top view detail similar to FIG. 13, but showing the first jaw as rotated to an open or release configuration.

In FIG. 14, jaw 104 is in the open or release configuration, by which lip 136 and lip end 138 have been swung out of the way. Lip 136 therefore no longer presents a barrier to the rearward extraction of cell phone C. Further, inner tab 510 (and lower tab 512, not shown in this FIGURE) are in contact with the back surface 1400 of cell phone C.

This FIGURE illustrates a cell phone C about to be extracted from mount 100, or a cell phone C about to be installed into a mount 100. In the former instance, the user has pinched tab 202 toward tab 200, causing the entirety of jaw 104 to rotate laterally outwardly. Tab 510 (and tab 512) push on the back surface 1400 to rearwardly displace the cell phone C, making cell phone C more extractable by one hand. In the latter instance, the user is about to push tab 510 (and tab 512) in a frontward direction through the back surface 1400 of cell phone C. A user is thereby able to push tabs 510, 512, thereby rotating jaw 104 out of the second detented position back to the first detented position, and swinging in lip 136 to cage the lateral right side 302 of the phone C.

FIGS. 15A-15C and FIG. 16 illustrate steps in a personal electronic device mounting process made possible by the invention. At step 1598, the user loosens the jaw-clamping knob 430 and opens the jaws by sliding jaw 110 leftward to its widest position. At step 1600, the user uses inner tabs 510, 512 to rotate jaw 104 to the closed configuration, either by pressing them with his or her fingers or using the back surface 1400 of the cell phone. This last method will automatically cause the phone to be inserted at 1602. Otherwise, the user vertically drops the phone into the jaws 104, 106 at this step. See FIG. 15A.

At step 1604, the user slides jaw 106 toward or away from jaw 104, thereby adjusting or "sizing" the width between jaws 104 and 106 to the width of the cell phone. At step 1606, the user pinches the external tabs 200, 202 to rotate jaw 104 to the open configuration, and removes the phone (1608). See FIG. 15B. Alternatively, the user simply vertically lifts the phone out of the jaws.

Now that the mount 100 is again empty, at step 1610 the user affixes the mount 100 to a surface, such as the interior surface of a windshield. This can be done by actuating the suction cup assembly 114. If an articulated arm assembly such as the one shown in FIGS. 18-20 is used, the user may also adjust the angle of the arm assembly 114 relative to the axis of the suction cup assembly 116. If a telescoping arm assembly such as the one shown in FIGS. 22-29 is used, the user may also adjust the arm length at this time.

Preliminary to step 1612, the mount 100 must be in the open configuration and empty. In this condition, the user displaces the cell phone in a forward direction, until tabs 510 and 512 are contacted. When contact with the cell phone back surface 1400 is made (FIG. 14), further pushing by the user will cause (1614) the right jaw 104 to rotate closed (FIG. 13). The pushing force exerted by the user must be at least a predetermined force for overcoming the resistance created by the detent structure. Responsive to this, the mount 100 is now in a closed configuration, and securely holds the phone. If an adjustment of the cell phone viewing plane is necessary, this is done at step 1616, following which the viewing plane is set by tightening knob 418.

Figure 15A:
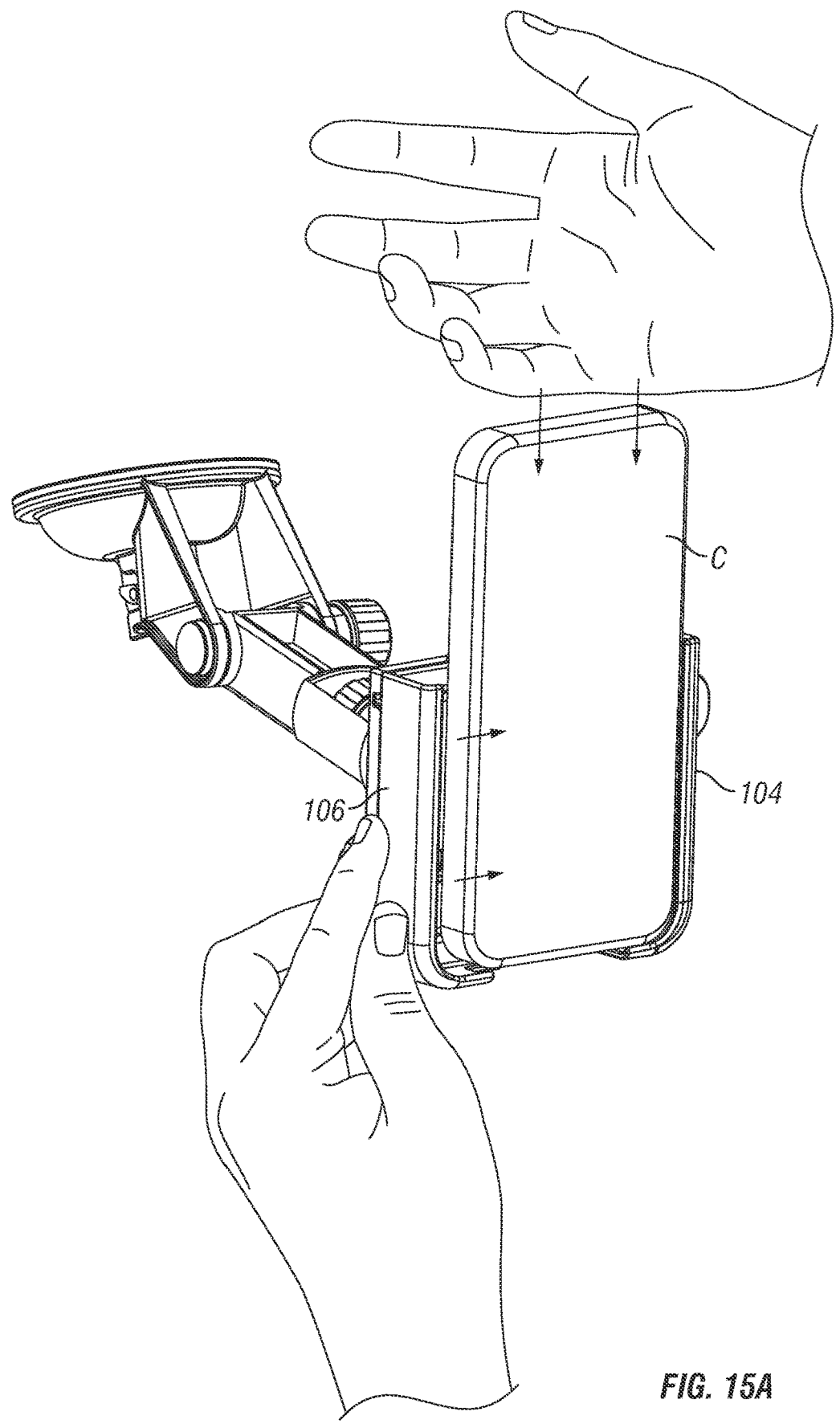
FIG. 15A is a view of initial steps of installing a cell phone in the mount, the initial steps including sizing the mount for a particular cell phone.
Figure 15B:
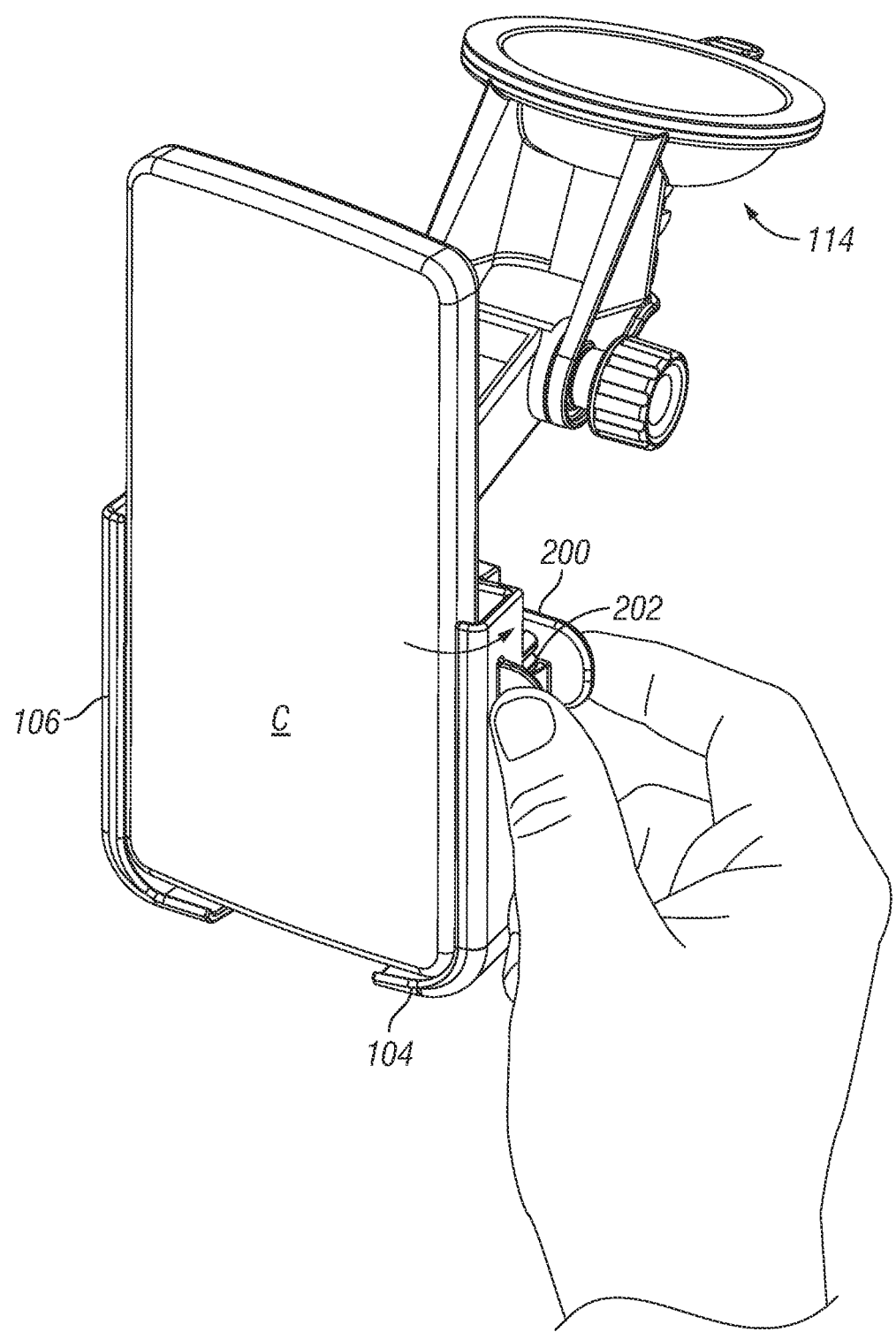
FIG. 15B is a view of a step of removing the cell phone from the mount after the jaws have been sized to the cell phone width, and also is a view of a step of removing the cell phone from the mount after the mount has been affixed to the windshield.
Figure 15C:
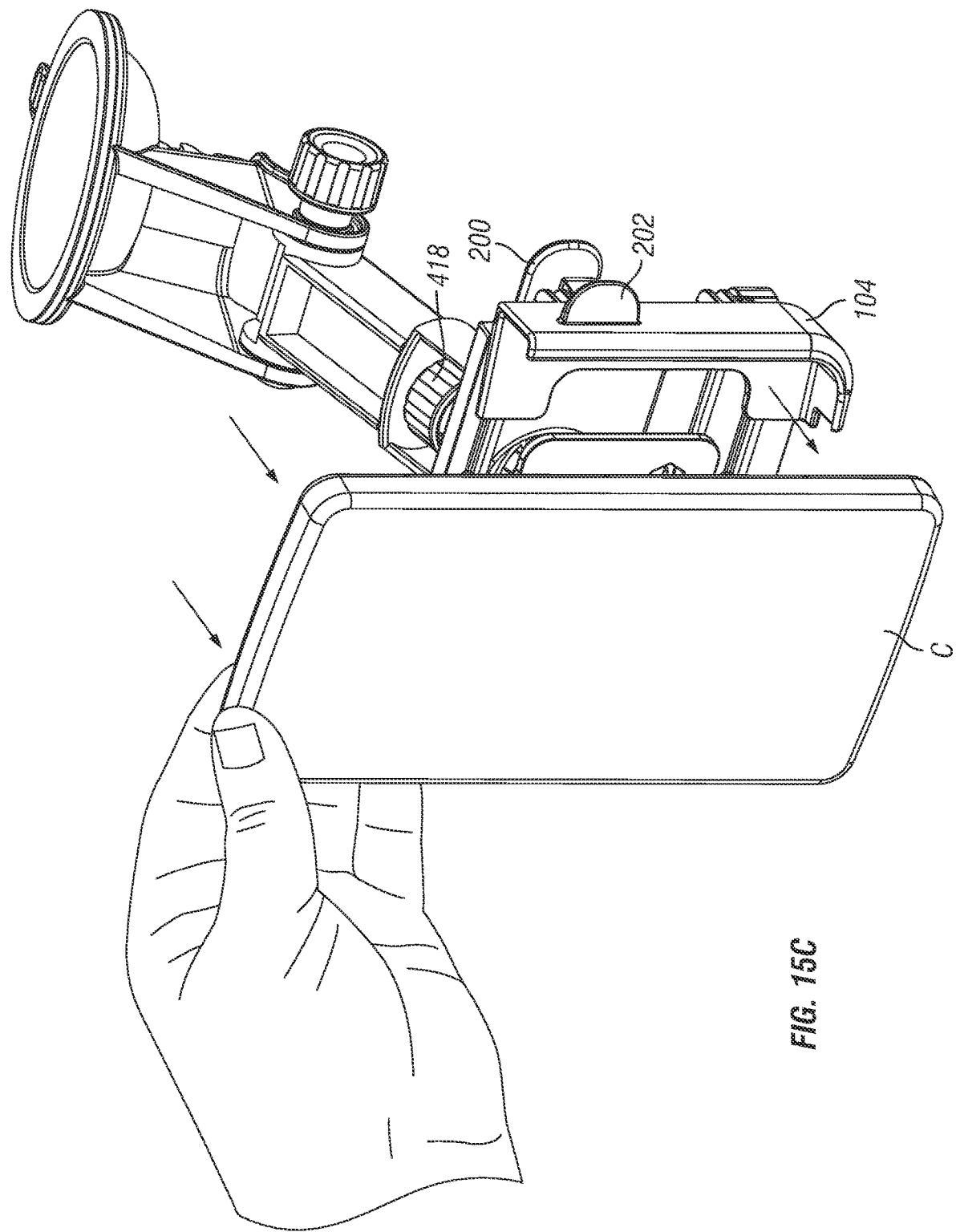
FIG. 15C is a view of a step of removing a cell phone from the mount with one hand.
Figures 16, 17:
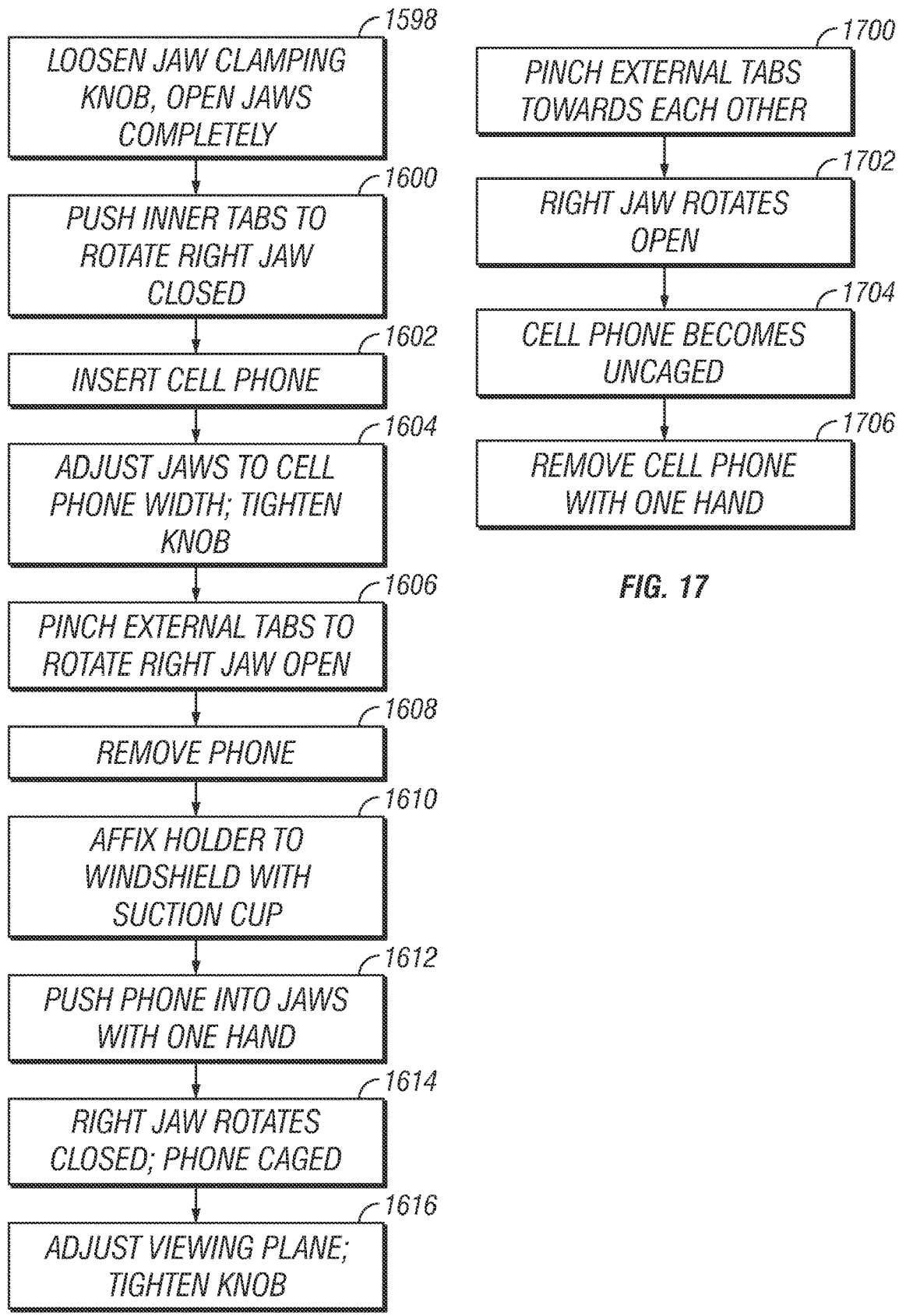
FIG. 16 is a block diagram of steps of a process for installing a cell phone in a mount according to the invention, and affixing the mount to the interior surface of a windshield.
FIG. 17 is a block diagram of steps of a process for removing a cell phone from the mount after the mount has been affixed to a windshield.

The mounted phone is now ready for use. When the user wishes to remove the phone from the mount, at step 1700 (FIGS. 15B and 17) the user pinches external finger tab 202 toward finger tab 200, which may be accomplished with one hand. Responsive to this force, the jaw 104 leaves the detented closed configuration and rotates to the open configuration at step 1702. This uncages the right side of the phone at step 1704. The user may then remove the cell phone with one hand at step 1706 (FIG. 15C). FIG. 15C shows this step being accomplished by the left hand, but it could as or more easily be accomplished with the right hand.

Now that the mount has been set up and affixed to the windshield, the user need only perform step 1612 to re-install the phone into the mount, as the width between the channel jaws has already been customized to the width of the phone.

Figure 22:
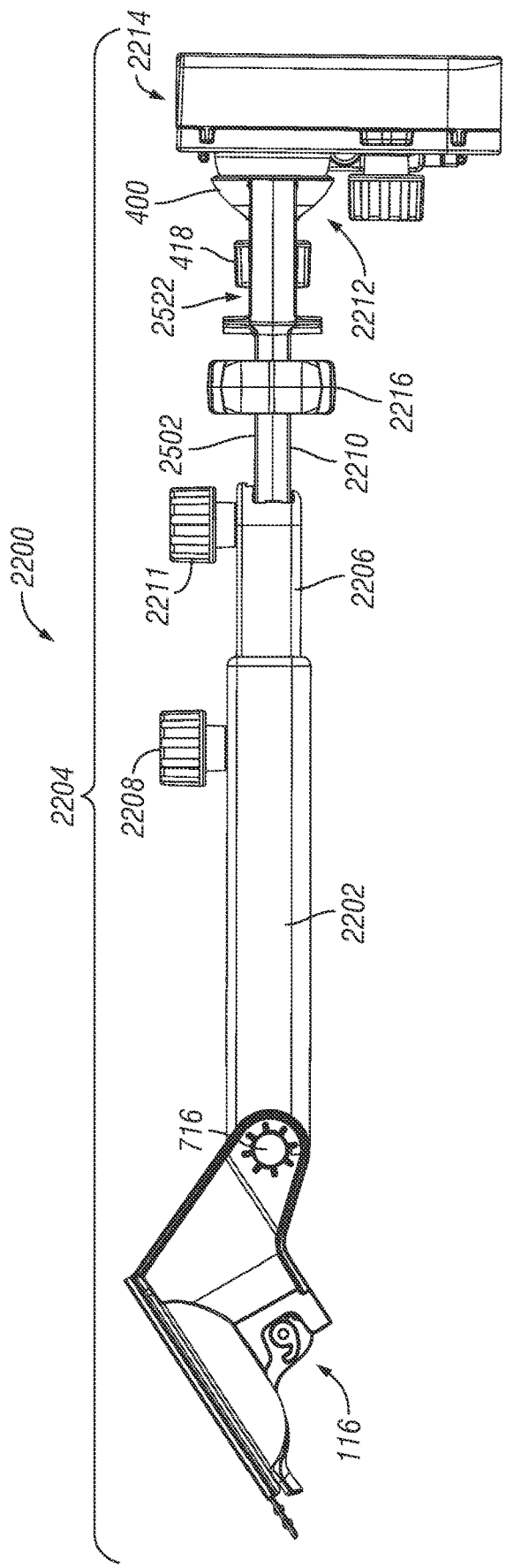
FIG. 22 is an elevational view of a windshield phone mount as including a telescoping extension arm and bumper.
Figure 23:
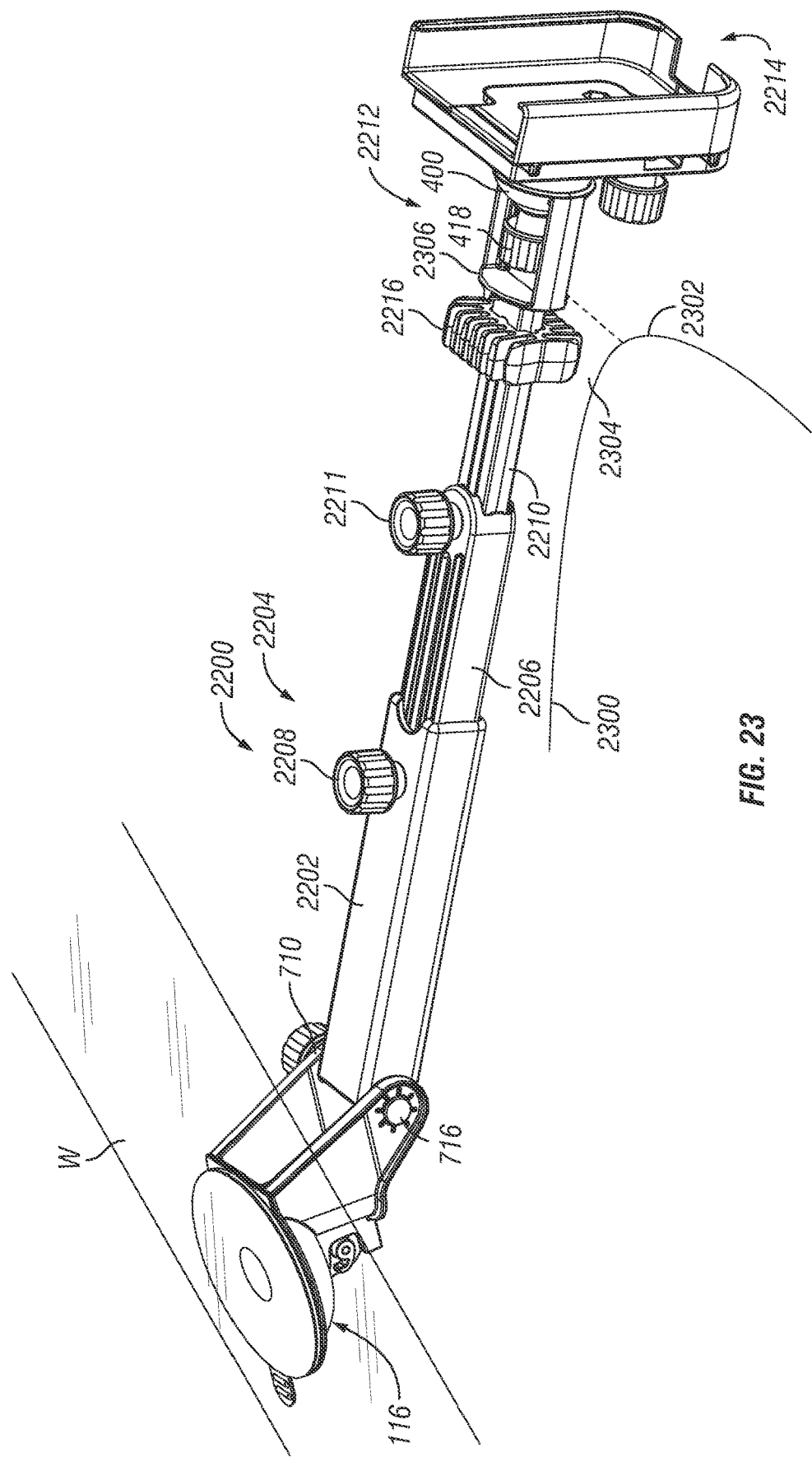
FIG. 23 is a top rear left perspective view of a windshield phone mount as installed in a vehicle.

A further embodiment of a windshield mount for a personal electronic device is indicated generally at 2200 in FIG. 22. Mount 2200 includes a surface affixation member or windshield mounting component 116, which in the illustrated embodiments is a suction cup assembly and which has been described in detail above. The mounting component 116 is rotatably attached to a forwardmost arm component 2202 of a telescoping arm assembly 2204 by means of carriage bolt 716 through pivot housing 710 (FIG. 23). An intermediate arm component 2206 slides in and out of a channel (described below) formed in forward arm component 2202 and is affixed thereto by means of a flat-headed bolt (described below) and a knob 2208. A rearwardmost arm component 2210 slides in and out of a channel (described below) formed in component 2206 and is affixed thereto by means of a further bolt (described below) and a knob 2211. Component 2210 terminates in a partial sphere 400 with a rearwardly facing concave surface. Parts 400-418 (see FIG. 4) form a ball and joint assembly 2212 that has been described above. The ball and joint assembly 2212 joins the arm assembly 2204 to a personal electronic device mounting bracket 2214, one embodiment of which has been described in detail in conjunction with FIGS. 1-16.

The illustrated embodiment of the telescoping arm assembly 2204 has three arm components. Other embodiments may include only two telescoping components, or may have more than three.

An elastomeric bumper 2216 is mounted on a forward portion 2502 of the arm component 2210. Bumper 2216 may be formed of a thermoplastic elastomer (TPE) and may be disposed at any of various user-selected positions along arm component 2210.

A total length of the arm assembly 2204 from bolt/axle 716 to ball and socket assembly 2212, and from a front end of assembly 2204 to a rear end thereof, may be adjusted by the user by sliding one or both of the arm components 2206, 2210 into and out of the channels of the respective arm components to their immediate front. FIG. 23 depicts arm assembly 2204 in its full extension, in which the length of the arm assembly 2204 between its front end and its rear end is maximized. This may be done where the mount 2200 is installed in a large vehicle with a relatively large depth of a dashboard 2300 between windshield W and a rearward dashboard edge 2302. For vehicles with less-deep dashboards, less of the lengths of the arm components 2206 and 2210 need to be used.

Figure 21:
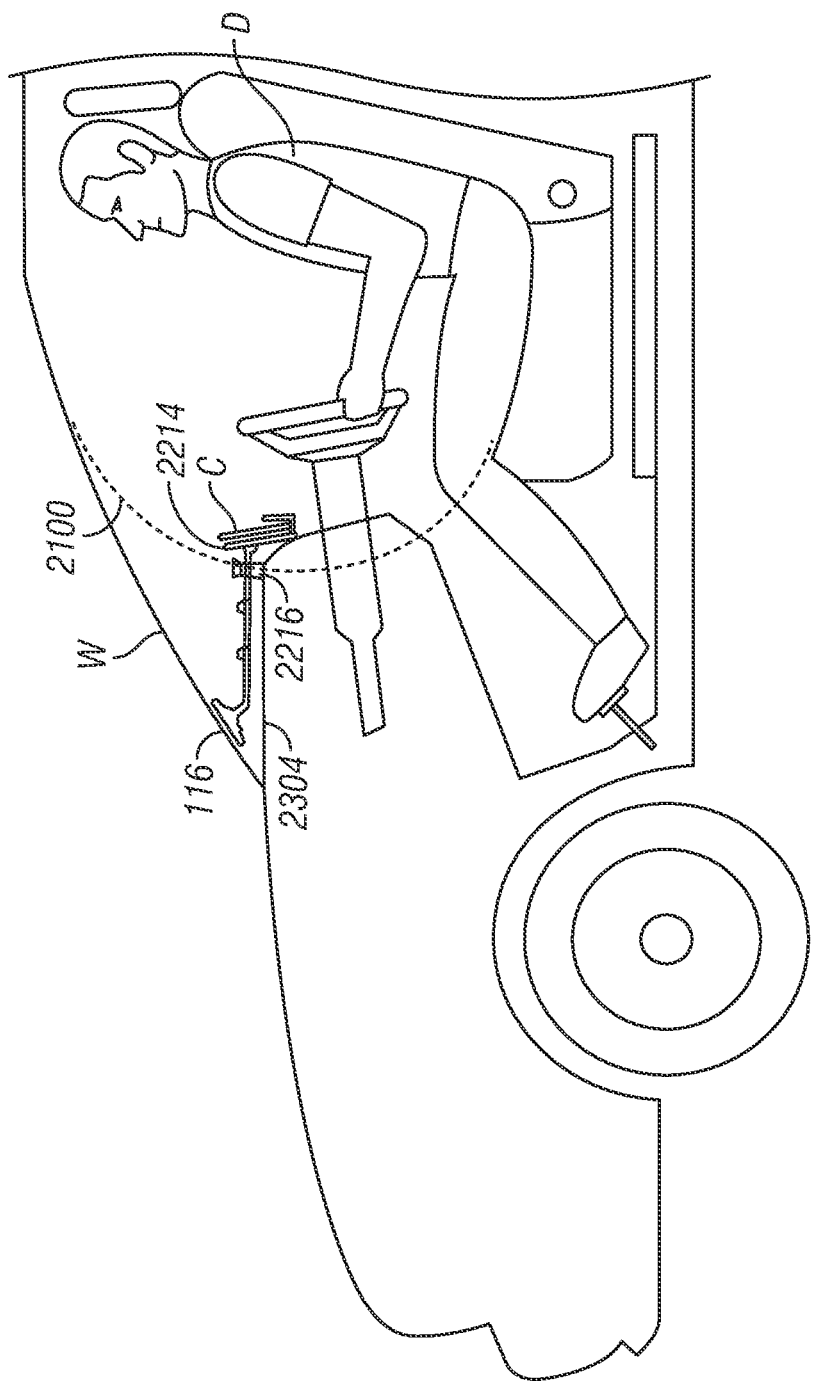
FIG. 21 is a schematic elevational view of a front portion of a vehicle interior, showing a maximum reach envelope of a driver and the use of a further embodiment of a windshield phone mount according to the invention.

The bumper 2216 rests on a top surface 2304 of the dashboard 2300, near its rearward edge 2302. A rearward portion 2306 of the arm component 2210 extends rearwardly beyond the dashboard edge 2302, and the bracket 2214 is suspended in space to the rear of edge 2302. As shown in FIG. 21, this brings the cell phone bracket 2214 within a maximum reach envelope 2100 of a driver D, making the cell phone or other personal electronic device carried by bracket 2214 more safely and easily operable by driver D, particularly where driver D is restrained by a seat belt. The cell phone holding device, as including the telescoping arm assembly 2204, permits the positioning of the cell phone C very close to the top surface 2304 of dashboard 2300, and creates minimal view restriction. The resting of the bumper 2216 on the dashboard surface 2304 increases arm stability and capacity to bear the weight of cell phone C, which can be heavy.

Figure 24:
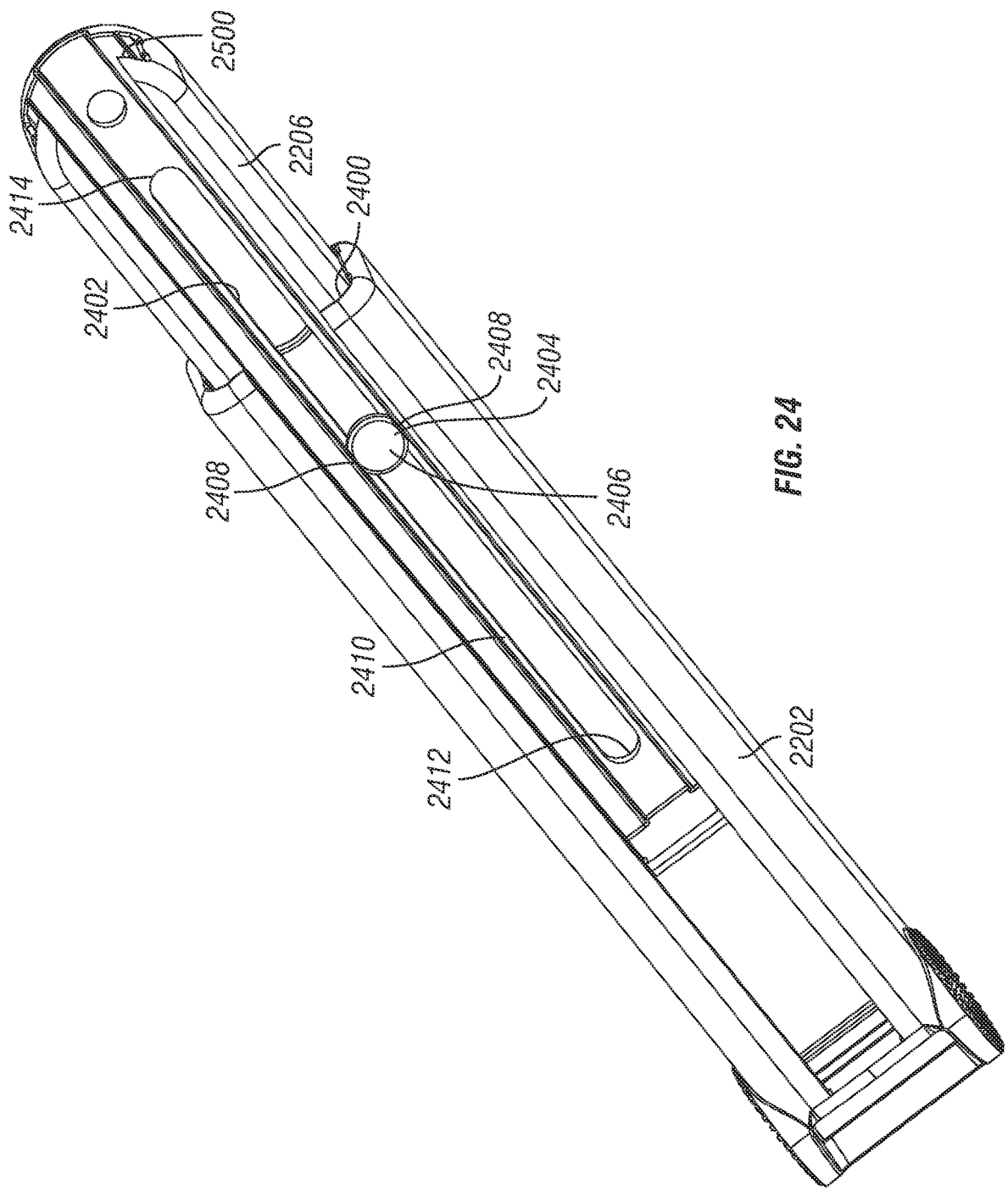
FIG. 24 is a bottom perspective view of forwardmost and intermediate arm components of the telescoping arm assembly.
Figure 25:
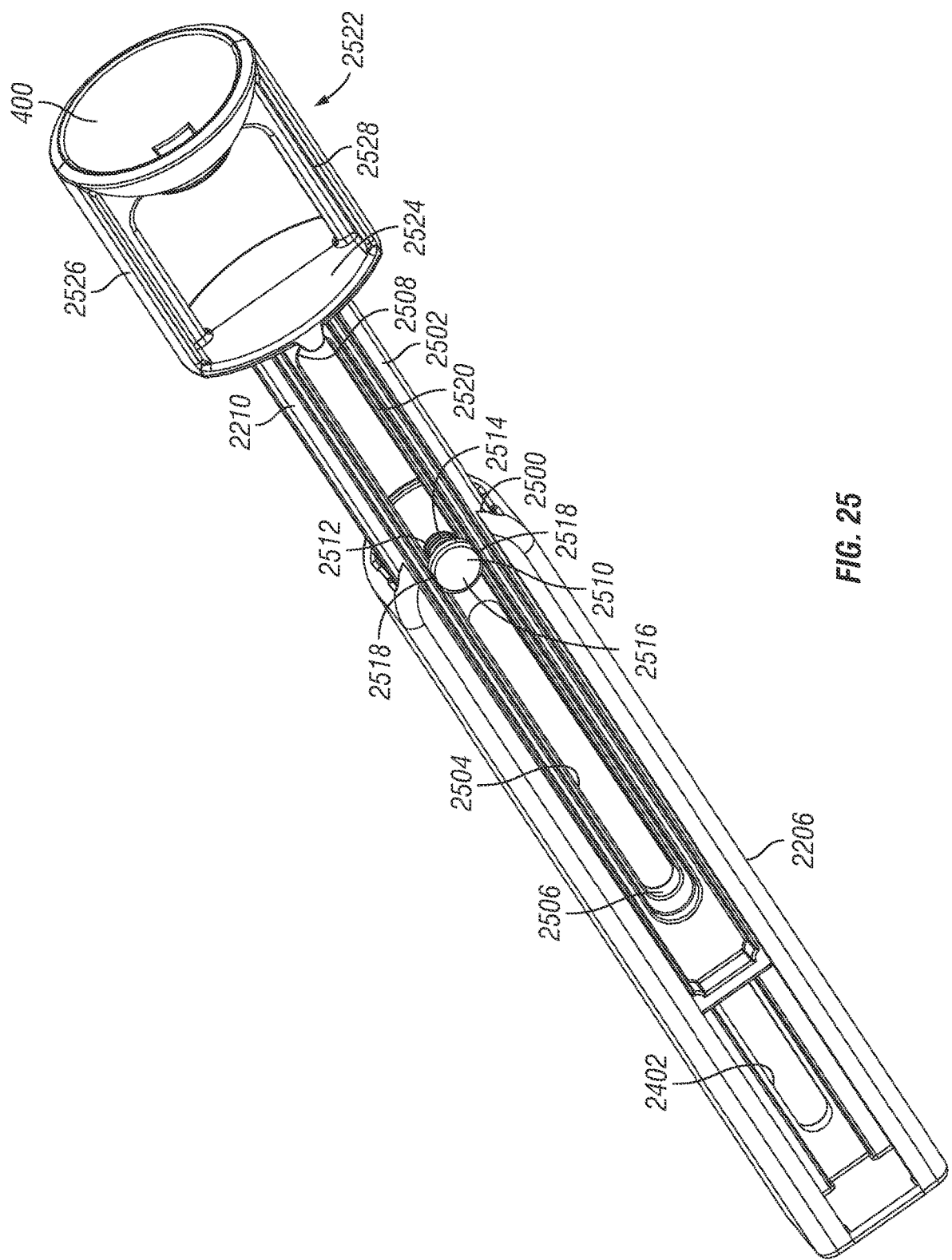
FIG. 25 is a bottom perspective view of intermediate and rearwardmost arm components of the telescoping arm assembly.

FIGS. 24 and 25 best illustrate how the different extension arm components 2202, 2206, 2210 slide in and out of, and are connected to, each other. Arm component 2202 has a lipped channel 2400 which slidably receives the body of arm component 2206. Arm component 2206 has a slot 2402 which extends for most of its length. A flat-headed bolt 2404 is inserted through slot 2402 and through a hole 2403 (FIG. 26)) in arm component 2202. The shaft 2405 of bolt 2404 is threadably engaged with knob 2208 (FIG. 23). A head 2406 of bolt 2404 has flat sides 2408 that ride within a groove 2410 that is a little wider than slot 2402. The depth of bolt head 2406 is less than the depth of groove 2410, so as not to interfere with the movement of arm component 2210 (FIG. 25).

As seen in FIG. 24, arm component 2206 may be slid out of lipped channel 2400 until a front end 2412 of the slot 2402 abuts the shaft 2405 of bolt 2404. Arm component 2206 may be slid into the lipped channel 2400 until a rear end 2414 of slot 2402 abuts the shaft 2405 of bolt 2404. The user is thus free to select a position of arm component 2206 relative to arm component 2202 anywhere between and including slot ends 2412 and 2414. Once a position is selected, the user tightens knob 2208 (FIG. 22) onto bolt 2404 to clamp the component 2206 to component 2202.

Figure 26:
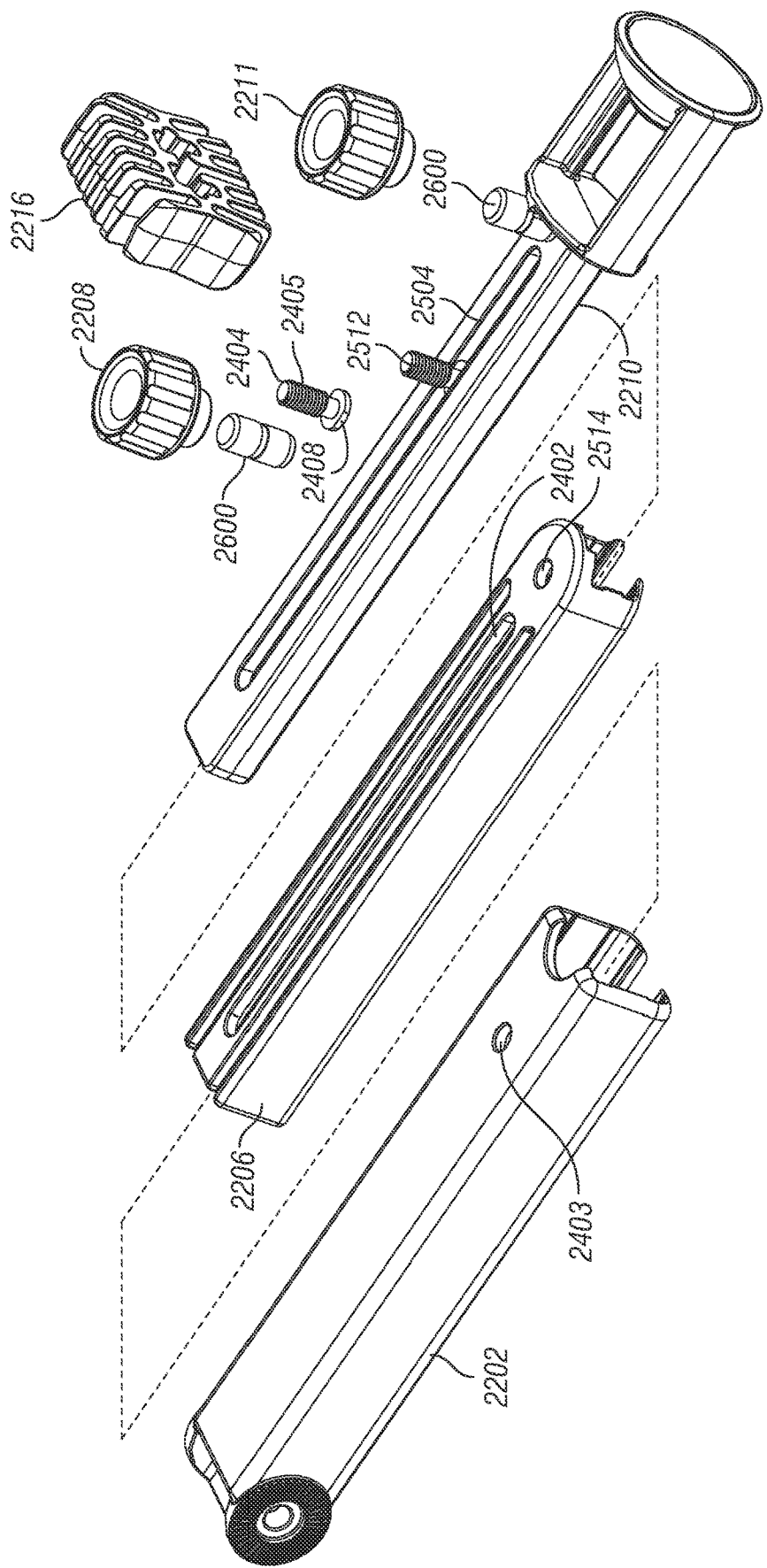
FIG. 26 is an exploded top rear left perspective view of a telescoping arm assembly.

The articulation of arm component 2210 with arm component 2206 is similar to that between arm components 2202 and 2206, and is illustrated in FIG. 25. Arm component 2206 has a lipped channel 2500 which slidably receives a front portion 2502 of the arm component 2210. The rearwardmost arm component 2210 has a slot 2504 that extends between a front end 2506 and a rear end 2508 thereof. A bolt 2510 is inserted through slot 2504. A threaded shaft 2512 of the bolt 2510 is threaded through a hole 2514 in the component 2206 and threadably engages with the knob 2211 (FIGS. 23 and 26). A head 2516 of the bolt 2510 (FIG. 25) has flat sides 2518 that slidably engage with a groove 2520, the width of which is a little wider than that of slot 2504.

Front portion 2502 of component 2210 may be slid into the lipped channel 2500 until rear slot end 2508 abuts bolt shaft 2512. Contrariwise, front portion 2502 of component 2210 may be slid out of the lipped channel 2500 until front end 2506 abuts the bolt shaft 2512. The user may select either of these extreme positions, or any position in between, and may then tighten knob 2211 onto bolt shaft 2512 to clamp component 2210 to component 2206 at the desired location. Extending more of front component 2210 out of intermediate component 2206 expands the range of positions at which bumper 2216 may be sited.

Rearwardmost arm component 2210 further has a rear portion 2522 which rearwardly extends from front portion 2502. A transverse plate 2524 is joined to a rear end of the portion 2502. From plate 2524, two spaced-apart opposed legs 2526 and 2528 extend rearwardly to partial sphere 400. The space rearward of plate 2524, inward of legs 2526 and 2528, and frontward of partial sphere 400, accommodates the ball joint clamping screw knob 418 (FIGS. 22 and 23). As seen in the exploded view of FIG. 26, each of the knobs 2208, 2211 may include threaded metal inserts 2600.

Figure 27:
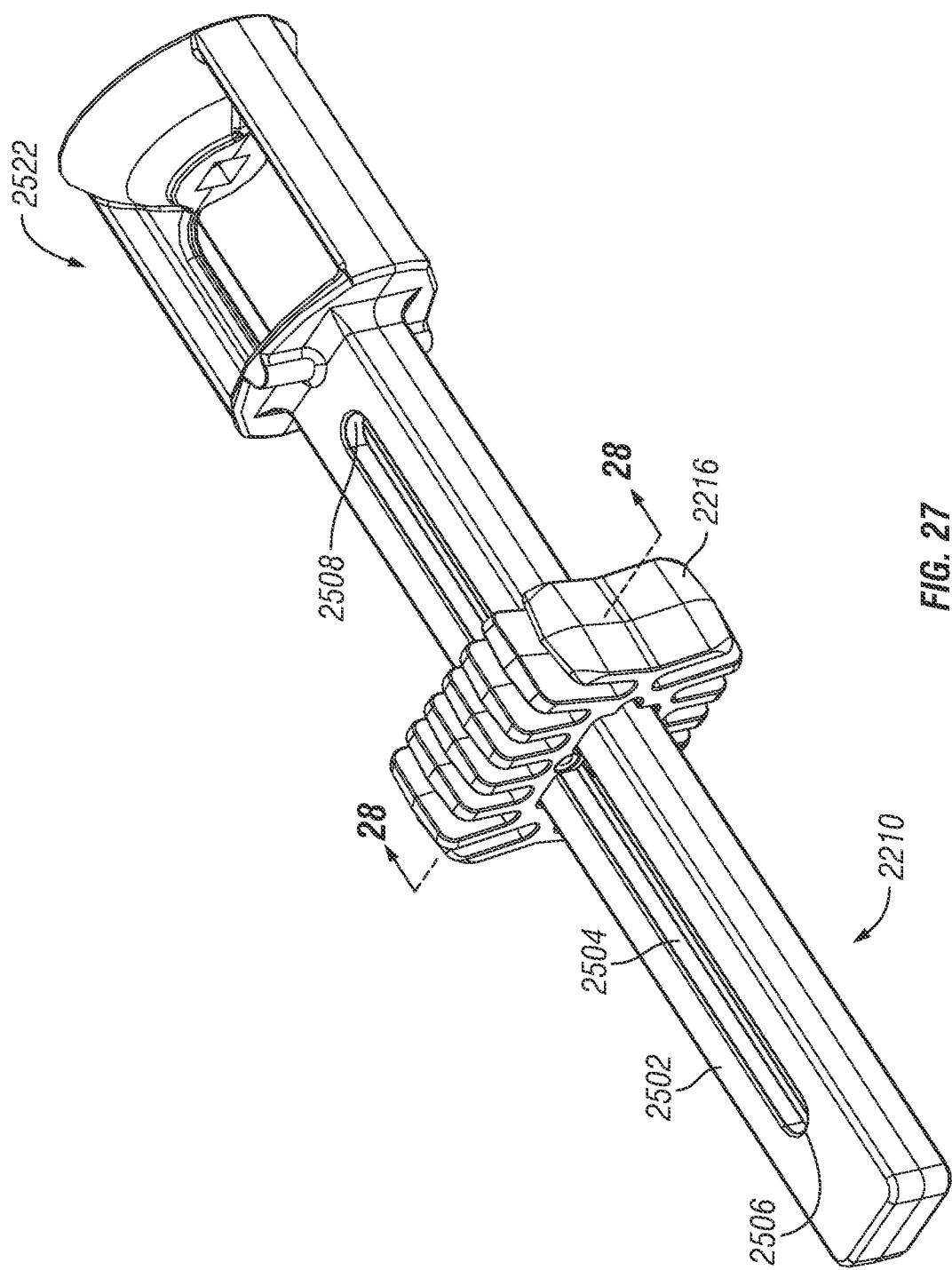
FIG. 27 is a top left front perspective view of a rearmost arm segment of the telescoping arm assembly shown in FIGS. 23 and 24, further showing a bumper fitted to this arm segment.

With reference to FIG. 27, the bumper 2216 may be fitted around the front portion 2502 of component 2210 anywhere along the exposed part of slot 2504. A downwardly extending finger 2800 of bumper 2216 (FIG. 28) fits within slot 2504. Once installed onto portion 2502, the position of bumper 2216 along slot 2504 may be adjusted the user by sliding bumper 2216 on the exposed part of portion 2502.

Bumper 2216 may have a substantially constant cross-section along its axial depth (that is, along its dimension that is aligned in use with the arm assembly 2204). In one embodiment, the bumper has a hollow inner shape 2802 (FIG. 28) that substantially, but not completely, conforms to the cross-sectional shape 2804 of arm component front portion 2502. The finger 2800 forms part of this inner shape 2802. The inner shape has left and right laterally extending grooves 2806, 2808 that are intentional departures from cross-sectional shape 2502.

The bumper 2216 has a cross-sectional outer locus or periphery 2810, shown in broken line, that is outwardly spaced from its inner shape 2802. In use, one of an upper portion 2812 of the periphery 2810, and a lower portion 2814 of the periphery 2810, will be in contact with dashboard surface 2304. The bumper 2216 therefore suspends arm component 2502 off of dashboard surface 2304 and supports a majority of the weight of the cell phone mounting bracket 2214, and cell phone C, both of which are disposed rearwardly of bumper 2216.

In the illustrated embodiment, an outer shape 2811 of the bumper is not simple but rather is heavily reticulated. To form the outer shape 2811, the upper and lower peripheries 2812, 2814 are interrupted by a series of deep grooves 2816, each of which extends from periphery 2810 to a respective bottom near the inner shape 2802. The grooves 2816 enhance the moldability of bumper 2216 and also increase its flexibility and ability to absorb shock. The grooves 2816 define a plurality of fingers 2817 therebetween.

The bottoms of certain of these grooves 2816 cooperate with the inner shape 2802 to form a series of living hinges. In the illustrated embodiment, there at least six of these. A bottom 2818 of upper left groove 2820 is disposed near the bottom of lateral groove 2806, creating a living hinge 2822 therebetween. A bottom 2824 of lower left groove 2826 is also disposed near the bottom of inner lateral groove 2806, creating a living hinge 2828 therebetween. A bottom 2830 of upper right groove 2832 is disposed near the bottom of right lateral groove 2808, creating a living hinge 2834 therebetween. A bottom 2836 of lower right groove 2838 is disposed near the bottom of right lateral groove 2808, creating a living hinge 2840 therebetween. A bottom 2842 of upper central groove 2844 is close to an upper left corner 2846 and to an upper right corner 2848 of the inner shape 2802, respectively creating living hinges 2850 and 2852 therebetween. Upper left corner 2846 is formed at the junction of a left upper surface 2845 of inner shape 2802 and slot finger 2800, while upper right corner 2848 is formed at the junction of a right upper surface 2847 of inner shape 2802 and finger 2800. The finger 2800 divides the left upper surface 2845 from the right upper surface 2847.

The bumper 2216 substantially surrounds, in a cross-sectional plane, the arm component portion 2502. But bumper 2216 has an opening 2858 that extends from the periphery 2810 to the inner shape 2802. Opening 2858 is defined by a left wall 2854 which, in the illustrated embodiment, is spaced from a right wall 2856; in other embodiments walls 2854 and 2856 may have no space between them in an unflexed condition. Opening 2858 separates a left side or portion 2855 of the bumper 2216 from a right side or portion 2857. Portions 2855 and 2857 are connected together only by a living hinge, or, as in the illustrated embodiment, by multiple living hinges 2824, 2822, 2850, 2852, 2834 and 2840 arranged in series.

Figure 29:
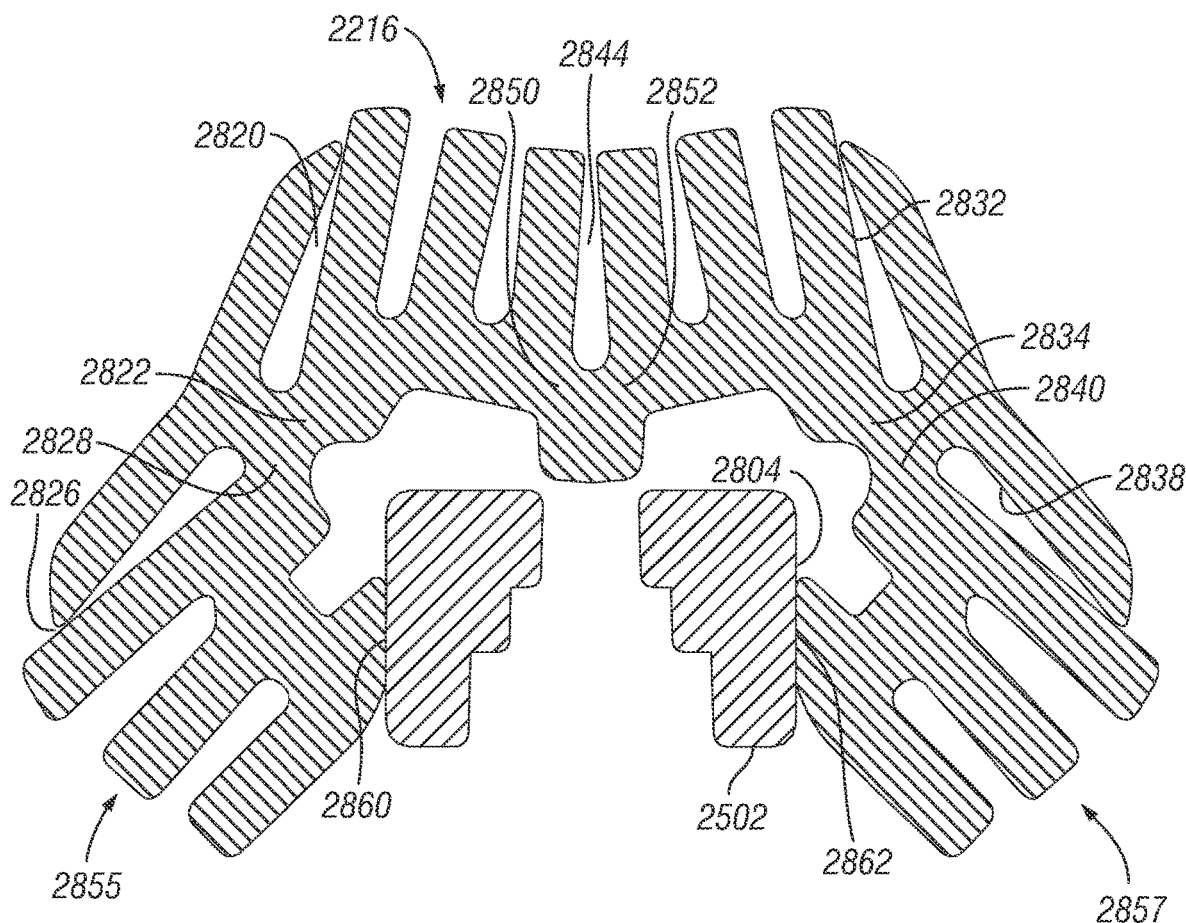
FIG. 29 is a sectional view similar to FIG. 28, but showing the bumper being pried apart by the rearwardmost arm segment as the bumper is being installed around the rearwardmost arm segment.

Because bumper 2216 is elastomeric, it may be installed on the arm portion 2502 by prying apart wall 2854 from wall 2856 and inserting therethrough the arm segment portion 2502. The maximum degree of distortion of bumper 2216 comes as the arm portion 2502 forces apart inner shape shoulder 2860 from inner shape shoulder 2862, as seen in FIG. 29. At this point all of the living hinges 2828, 2822, 2850, 2852, 2834 and 2840 are flexed, permitting this distortion to occur without tearing the bumper. This flexing is also aided by the deep grooves, particularly grooves 2826, 2820, 2844, 2832 and 2838, as bumper material may be displaced into those grooves during flexure.

Figure 28:
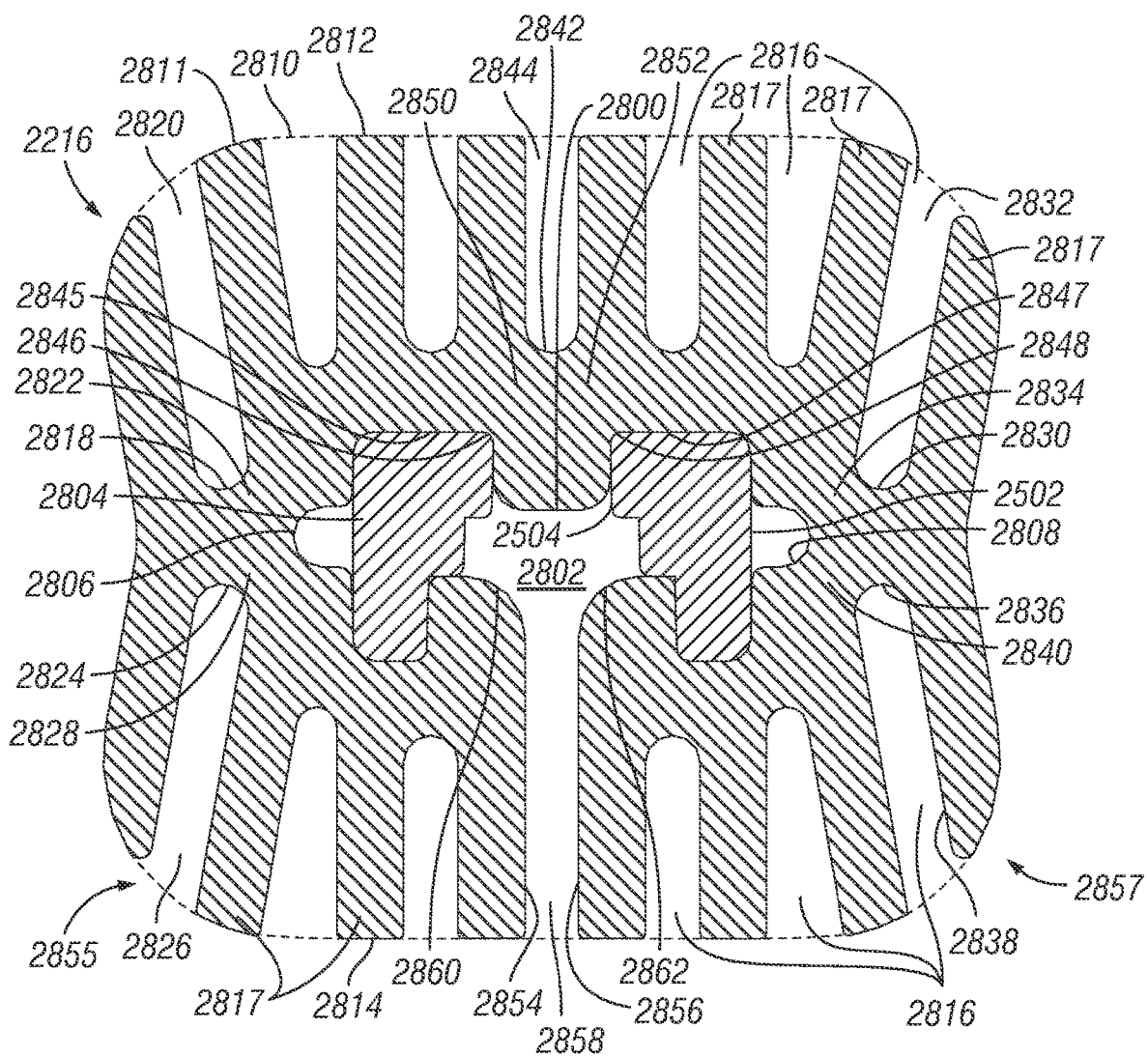
FIG. 28 is a sectional view taken substantially along Line 28-28 of FIG. 27.

After the arm segment portion 2502 passes by shoulders 2860 and 2862, the elastomeric living hinges 2828, 2822, 2850, 2852, 2834 and 2840 will urge the bumper 2216 to assume its unflexed shape, as seen in FIG. 28. The arm segment front portion 2502 will then be seated within inner shape 2802 and most of the walls of inner shape 2802 will be adjacent to respective walls of the arm segment portion 2502.

In another embodiment (not shown), bumper 2216 may be affixed to the arm component 2210 by means other than, or in addition to, elastically snapping the bumper body around the arm by the use of living hinge(s). For example, bumper 2216 could be affixed to the arm component 2210 by means of a screw, pin or a non-living hinge or closure that would simply be closed once the bumper was positioned at the desired location.

Figure 30:
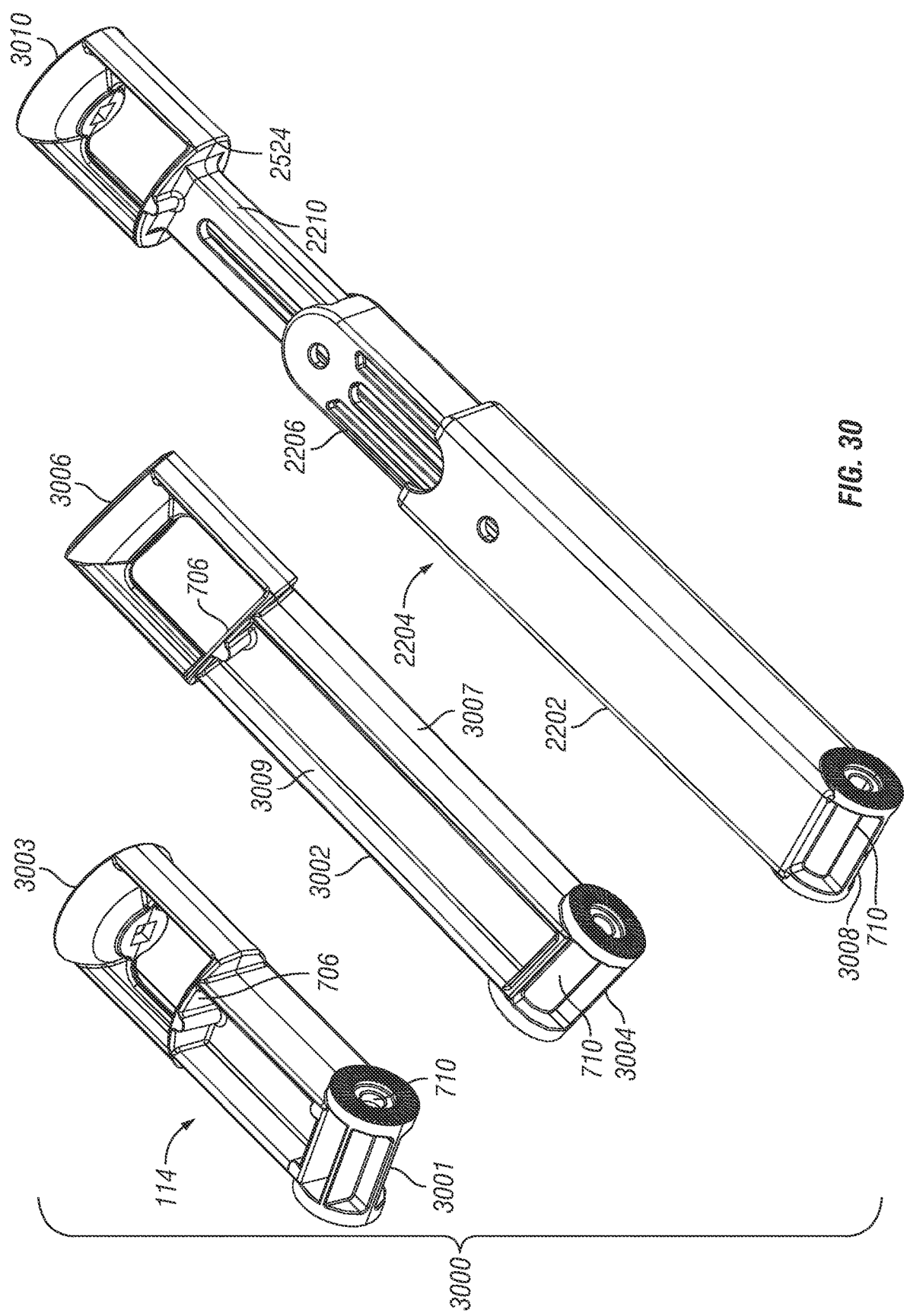
FIG. 30 is a perspective view of three extension arms provided as a kit to the user, one of which is to be used by the user to assemble a windshield mount according to the invention.

In one embodiment, a kit of different attachment arms and arm assemblies is supplied to the consumer. Once such kit is shown in FIG. 30. The kit 3000 includes a short arm 114, identical to the arm 114 depicted in FIGS. 1-4 and 15A-15C. The short arm 114 has a predetermined length between a front end 3001 and a rear end 3003 thereof. The kit 3000 further includes a longer, but still one-piece, arm 3002, which differs from arm 114 only in that the length between a rear end 3004 and a front end 3006 thereof is longer. In particular, parallel members 3007 and 3009 are longer than corresponding arm members 712 and 714, all other elements of arms 114, 3002 being similar to each other. The final element of kit 3000 is arm assembly 2204 and its three arm components 2202, 2206 and 2210, all previously described. A total length of assembly 2204 between a front end 3008 and a rear end 3010 thereof is variable, but in any event is longer than the length between ends 3004, 3006 of second arm 3002. The user selects one of these arms or arm assemblies for use in assembling it to a windshield attachment unit 116 and a device mount 2214, thereby creating a complete mount.

In summary, a telescoping extension arm assembly has been provided that brings the mounted personal electronic device within the maximum reach envelope of the driver. A bumper is used to stabilize the mount and create a point of contact near the dashboard edge, supporting the device mounting bracket rearwardly from the bumper and the dashboard edge in cantilever fashion. A kit of arms may be provided to the consumer for the consumer to selectively use in assembling a complete windshield phone mount.

While illustrated embodiments of the present invention have been described and illustrated in the appended drawings, the present invention is not limited thereto but only by the scope and spirit of the appended claims.

I claim:

1. A mount for a personal electronic device, the mount comprising:
   a mounting component for affixation to a rear surface of vehicle windshield;
   a device mounting bracket for holding the personal electronic device;
   an elongate arm assembly joined to and extending between the mounting component and the device mounting bracket, a total length of the elongate arm assembly extending, in use, beyond a rearward margin of a vehicle dashboard, such that the device mounting bracket is positioned rearwardly of the rearward margin of the vehicle dashboard, a first arm component of the arm assembly positioned, in use, over the rearward margin of the vehicle dashboard, the first arm component having a cross-sectional shape; and
   a bumper integrally molded of elastomeric material and substantially surrounding the cross-sectional shape of the first arm component, a hollow inner shape of the bumper substantially conforming to the cross-sectional shape of the first arm component, a bumper outer periphery spaced from and surrounding the inner shape, an opening extending from the outer periphery to the inner shape, the opening having first and second opposed sidewalls disposed at a first width from each other when the bumper is in an unflexed condition, at least one outer groove inwardly extending toward the inner shape from the outer periphery and having a groove bottom near the inner shape, at least one living hinge formed between the groove bottom and the inner shape, such that prying force flexes the at least one living hinge and moves the first sidewall away from the second sidewall such that the first sidewall is disposed at a second width from the first sidewall which is greater than the first width, the opening then permitting the insertion of the cross-sectional shape of the first arm component into the inner shape of the bumper, the first sidewall returning to be disposed at the first width from the second sidewall once the prying force is removed;
   the bumper positioned on the first arm component near the rearward margin of the vehicle dashboard, whereby the bumper and not the first arm component will contact the dashboard near the rearward margin thereof.

2. The mount of claim 1, wherein a plurality of outer grooves inwardly extend from the outer periphery toward the inner shape, each of the outer grooves having a bottom disposed near the inner shape, a plurality of living hinges formed between ones of the bottoms of the outer grooves and the inner shape.

3. The mount of claim 1, wherein the arm assembly includes a second arm component, the first arm component slidable with respect to the second arm component such that a length of the arm assembly between the mounting component and the device mounting bracket may be adjusted.

4. The mount of claim 3, wherein the arm assembly further includes a third arm component, the second arm component slidably attached to the third arm component, the first arm component slidably attached to the second arm component, a forward end of the third arm component joined to the mounting component, a rear end of the first arm component joined to the device mounting bracket.

5. The bumper and arm assembly of claim 1, wherein the bumper is slidable to any of a plurality of user-selected positions along the major portion of the length of the arm.

6. A bumper for supporting an elongate structural member above a support surface, the bumper comprising:
   a body integrally molded of an elastomeric material;
   a hollow inner shape formed in the body, the shape substantially conforming to a predetermined cross-sectional shape of the structural member;

the body having an outer periphery substantially surrounding the inner shape in cross section and spaced from the inner shape, a portion of the outer periphery contacting the support surface when the bumper is mounted around the structural member and when the bumper is being used to support the structural member above the support surface;

a plurality of outer grooves opening on the outer periphery and extending inwardly toward the inner shape, each outer groove having a bottom, at least one living hinge formed between one of the bottoms of the outer grooves and the inner shape;

an opening in the body extending from the outer periphery to the inner shape, the opening spacing a first side of the body from a second side of the body by a first width when the body is in an unflexed condition;

the bumper adapted to being installed around the cross-sectional shape of the structural member by exerting prying force between the first side and the second side so that the first side is forced away from the second side, such that the first side is spaced from the second side by a second width larger than the first width, the at least one living hinge flexing responsive to the prying force, the cross-sectional shape of the structural member then being inserted through the opening and seated within the inner shape of the body of the bumper, the first side returning to a position at the first width from the second side when the prying force is removed.

7. The bumper of claim 6, wherein the inner shape has a bottom opposed to the opening, a left side wall upwardly extending from the bottom and a right side wall upwardly extending from the bottom and spaced from the left side wall, a left inner groove leftwardly extending toward the periphery from the left side wall and having a left inner groove bottom, a right inner groove rightwardly extending toward the periphery from the right side wall and having a right inner groove bottom, the outer grooves including a first outer groove and a second outer groove, a bottom of the first outer groove being near the left inner groove bottom, a first living hinge formed by the proximity of the bottom of the first outer groove to the left inner groove bottom, a bottom of the second outer groove being near the right inner groove bottom, a second living hinge formed by the proximity of the bottom of the second outer groove to the right inner groove bottom.

8. The bumper of claim 7, wherein the outer grooves further include a third outer groove with a bottom disposed near the left inner groove bottom and a fourth outer groove with a bottom disposed near the right inner groove bottom, a third living hinge formed by the proximity of the bottom of the third outer groove to the left inner groove bottom, a fourth living hinge formed by the proximity of the bottom of the fourth outer groove to the right inner groove bottom.

9. The bumper of claim 6, wherein the outer periphery has an upper portion, the outer grooves including a central outer groove extending downwardly from the upper portion, the inner shape having a left upper surface, a right upper surface and a downwardly extending finger dividing the left upper surface from the right upper surface, the left upper surface and the finger forming a left upper corner and the right upper surface and the finger forming a right upper corner, a bottom of the central outer groove being disposed near the left and right upper corners of the inner shape, a first living hinge formed between the left upper corner and the bottom of the central outer groove, a second living hinge formed between the right upper corner and the bottom of the central outer groove.

* * * * *